US012494212B2

(12) United States Patent
Gao et al.

(10) Patent No.: US 12,494,212 B2
(45) Date of Patent: Dec. 9, 2025

(54) AUDIO ENCODING AND DECODING METHOD AND APPARATUS

(71) Applicant: HUAWEI TECHNOLOGIES CO., LTD., Guangdong (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 18/202,553

(22) Filed: May 26, 2023

(65) Prior Publication Data

US 2023/0298600 A1 Sep. 21, 2023

Related U.S. Application Data

(63) Continuation of application No. PCT/CN2021/096841, filed on May 28, 2021.

(30) Foreign Application Priority Data

Nov. 30, 2020 (CN) ......................... 202011377320.0

(51) Int. Cl.
*G10L 19/008* (2013.01)

(52) U.S. Cl.
CPC .................................. *G10L 19/008* (2013.01)

(58) Field of Classification Search
CPC ....... G10L 19/008; G10L 19/20; H04S 3/008; H04S 7/303; H04S 2420/03
See application file for complete search history.

(56) References Cited

U.S. PATENT DOCUMENTS

2017/0194014 A1* 7/2017 Kim ........................ G10L 19/20
2019/0379992 A1* 12/2019 Schmidt ............... H04R 1/1041
2023/0298600 A1 9/2023 Gao et al.

FOREIGN PATENT DOCUMENTS

CN 105447244 A 3/2016
CN 107147975 A 9/2017
(Continued)

OTHER PUBLICATIONS

Nicol (Sound Spatialization by Higher Order Ambisonics: Encoding and Decoding a Sound Scene in Practice from a Theoretical Point of View), May 2010, Proc. of the 2nd International Symposium on Ambisonics and Spherical Acoustics https://ambisonics10.ircam.fr/drupal/files/proceedings/keynotes/K4.pdf (Year: 2010).*
(Continued)

*Primary Examiner* — Yogeshkumar Patel
(74) *Attorney, Agent, or Firm* — WOMBLE BOND DICKINSON (US) LLP

(57) ABSTRACT

An audio encoding and decoding method and apparatus, and a non-transitory readable storage medium are provided. The encoding method includes: selecting a first target virtual speaker from a preset virtual speaker set based on a current scene audio signal; generating a first virtual speaker signal based on the current scene audio signal and attribute information of the first target virtual speaker; and encoding the first virtual speaker signal to obtain a bitstream. According to the encoding method, an amount of encoded data is reduced, to improve encoding efficiency.

13 Claims, 9 Drawing Sheets

(56) References Cited

FOREIGN PATENT DOCUMENTS

| | | | |
|---|---|---|---|
| CN | 105284131 | B | 9/2018 |
| EP | 4246510 | A4 | 4/2024 |
| JP | 2012133366 | A | 7/2012 |
| WO | 2019241345 | A1 | 12/2019 |
| WO | 2022110723 | A1 | 6/2022 |

OTHER PUBLICATIONS

Hellerud, Erik et al: "Encoding Higher Order Ambisonics with AAC", AES Convention 124; May 2008, AES, 60 East 42nd Street, ROOm2520 New York 10165-2520, USA, May 2008 (May 1, 2008), XP040508582, total 8 pages.

* cited by examiner

AUDIO ENCODING AND DECODING METHOD AND APPARATUS

CROSS-REFERENCE TO RELATED APPLICATIONS

This application is a continuation of International Application No. PCT/CN2021/096841, filed on May 28, 2021, which claims priority to Chinese Patent Application No. 202011377320.0, filed on Nov. 30, 2020. The disclosures of the aforementioned applications are hereby incorporated by reference in their entirety.

TECHNICAL FIELD

This application relates to the field of audio encoding and decoding technologies, and in particular, to an audio encoding and decoding method and apparatus.

BACKGROUND

A three-dimensional audio technology is an audio technology that obtains, processes, transmits, renders, and plays back sound events and three-dimensional sound field information in the real world. The three-dimensional audio technology endows sound with a strong sense of space, encirclement, and immersion, and provides people with an extraordinary auditory experience as if they are really there. A higher order ambisonics (HOA) technology has a property irrelevant to a speaker layout in recording, encoding, and playback phases and a rotatable playback feature of data in an HOA format, and has higher flexibility during three-dimensional audio playback, and therefore has gained more attention and research.

To achieve better audio auditory effect, the HOA technology requires a large amount of data to record more detailed information about a sound scene. Although such scene-based sampling and storage of a three-dimensional audio signal are more conducive to storage and transmission of spatial information of the audio signal, a large amount of data is generated as an HOA order increases, and the large amount of data causes difficulty in transmission and storage. Therefore, the HOA signal needs to be encoded and decoded.

Currently, there is a multi-channel data encoding and decoding method, including: at an encoder side, directly encoding each channel of an audio signal in an original scene by using a core encoder (for example, a 16-channel encoder), and then outputting a bitstream. At a decoder side, a core decoder (for example, a 16-channel decoder) decodes the bitstream to obtain each channel of a decoding scene.

In the foregoing multi-channel encoding and decoding method, a corresponding encoder and a corresponding decoder need to be adapted based on a quantity of channels of the audio signal in the original scene. In addition, as the quantity of channels increases, a large amount of data and high bandwidth occupation exist during bitstream compression.

SUMMARY

Embodiments of this application provide an audio encoding and decoding method and apparatus, to reduce an amount of encoded and decoded data, so as to improve encoding and decoding efficiency.

To resolve the foregoing technical problem, embodiments of this application provide the following technical solutions.

According to a first aspect, an embodiment of this application provides an audio encoding method, including:

- selecting a first target virtual speaker from a preset virtual speaker set based on a current scene audio signal;
- generating a first virtual speaker signal based on the current scene audio signal and attribute information of the first target virtual speaker; and
- encoding the first virtual speaker signal to obtain a bitstream.

In this embodiment of this application, the first target virtual speaker is selected from the preset virtual speaker set based on the current scene audio signal; the first virtual speaker signal is generated based on the current scene audio signal and the attribute information of the first target virtual speaker; and the first virtual speaker signal is encoded to obtain the bitstream. In this embodiment of this application, the first virtual speaker signal may be generated based on a first scene audio signal and the attribute information of the first target virtual speaker, and an audio encoder side encodes the first virtual speaker signal instead of directly encoding the first scene audio signal. In this embodiment of this application, the first target virtual speaker is selected based on the first scene audio signal, and the first virtual speaker signal generated based on the first target virtual speaker may represent a sound field at a location of a listener in space, the sound field at this location is as close as possible to an original sound field when the first scene audio signal is recorded. This ensures encoding quality of the audio encoder side. In addition, the first virtual speaker signal and a residual signal are encoded to obtain the bitstream. An amount of encoded data of the first virtual speaker signal is related to the first target virtual speaker, and is irrelevant to a quantity of channels of the first scene audio signal. This reduces the amount of encoded data and improves encoding efficiency.

In an embodiment, the method further includes:

- obtaining a main sound field component from the current scene audio signal based on the virtual speaker set; and
- the selecting a first target virtual speaker from a preset virtual speaker set based on a current scene audio signal includes:
- selecting the first target virtual speaker from the virtual speaker set based on the main sound field component.

In the foregoing solution, each virtual speaker in the virtual speaker set corresponds to a sound field component, and the first target virtual speaker is selected from the virtual speaker set based on the main sound field component. For example, a virtual speaker corresponding to the main sound field component is the first target virtual speaker selected by the encoder side. In this embodiment of this application, the encoder side may select the first target virtual speaker based on the main sound field component. In this way, the encoder side can determine the first target virtual speaker.

In an embodiment, the selecting the first target virtual speaker from the virtual speaker set based on the main sound field component includes:

- selecting an HOA coefficient for the main sound field component from a higher order ambisonics HOA coefficient set based on the main sound field component, where HOA coefficients in the HOA coefficient set are in a one-to-one correspondence with virtual speakers in the virtual speaker set; and
- determining, as the first target virtual speaker, a virtual speaker that corresponds to the HOA coefficient for the main sound field component and that is in the virtual speaker set.

In the foregoing solution, the encoder side preconfigures the HOA coefficient set based on the virtual speaker set, and there is a one-to-one correspondence between the HOA coefficients in the HOA coefficient set and the virtual speakers in the virtual speaker set. Therefore, after the HOA coefficient is selected based on the main sound field component, the virtual speaker set is searched for, based on the one-to-one correspondence, a target virtual speaker corresponding to the HOA coefficient for the main sound field component. The found target virtual speaker is the first target virtual speaker. In this way, the encoder side can determine the first target virtual speaker.

In an embodiment, the selecting the first target virtual speaker from the virtual speaker set based on the main sound field component includes:

obtaining a configuration parameter of the first target virtual speaker based on the main sound field component;

generating, based on the configuration parameter of the first target virtual speaker, an HOA coefficient for the first target virtual speaker; and determining, as the target virtual speaker, a virtual speaker that corresponds to the HOA coefficient for the first target virtual speaker and that is in the virtual speaker set.

In the foregoing solution, after obtaining the main sound field component, the encoder side may be used for determining the configuration parameter of the first target virtual speaker based on the main sound field component. For example, the main sound field component is one or several sound field components with a maximum value among a plurality of sound field components, or the main sound field component may be one or several sound field components with a dominant direction among a plurality of sound field components. The main sound field component may be used for determining the first target virtual speaker matching the current scene audio signal, the corresponding attribute information is configured for the first target virtual speaker, and the HOA coefficient of the first target virtual speaker may be generated based on the configuration parameter of the first target virtual speaker. A process of generating the HOA coefficient may be implemented according to an HOA algorithm, and details are not described herein. Each virtual speaker in the virtual speaker set corresponds to an HOA coefficient. Therefore, the first target virtual speaker may be selected from the virtual speaker set based on the HOA coefficient for each virtual speaker. In this way, the encoder side can determine the first target virtual speaker.

In an embodiment, the obtaining a configuration parameter of the first target virtual speaker based on the main sound field component includes:

determining configuration parameters of a plurality of virtual speakers in the virtual speaker set based on configuration information of an audio encoder; and selecting the configuration parameter of the first target virtual speaker from the configuration parameters of the plurality of virtual speakers based on the main sound field component.

In the foregoing solution, the audio encoder may prestore respective configuration parameters of the plurality of virtual speakers. The configuration parameter of each virtual speaker may be determined based on the configuration information of the audio encoder. The audio encoder is the foregoing encoder side. The configuration information of the audio encoder includes but is not limited to: an HOA order, an encoding bit rate, and the like. The configuration information of the audio encoder may be used for determining a quantity of virtual speakers and a location parameter of each virtual speaker. In this way, the encoder side can determine a configuration parameter of a virtual speaker. For example, if the encoding bit rate is low, a small quantity of virtual speakers may be configured; if the encoding bit rate is high, a plurality of virtual speakers may be configured. For another example, an HOA order of the virtual speaker may be equal to the HOA order of the audio encoder. In this embodiment of this application, in addition to determining the respective configuration parameters of the plurality of virtual speakers based on the configuration information of the audio encoder, the respective configuration parameters of the plurality of virtual speakers may be further determined based on user-defined information. For example, a user may define a location of the virtual speaker, an HOA order, a quantity of virtual speakers, and the like. This is not limited herein.

In an embodiment, the configuration parameter of the first target virtual speaker includes location information and HOA order information of the first target virtual speaker; and the generating, based on the configuration parameter of the first target virtual speaker, an HOA coefficient for the first target virtual speaker includes:

determining, based on the location information and the HOA order information of the first target virtual speaker, the HOA coefficient for the first target virtual speaker.

In the foregoing solution, the HOA coefficient of each virtual speaker may be generated based on the location information and the HOA order information of the virtual speaker, and a process of generating the HOA coefficient may be implemented according to an HOA algorithm. In this way, the encoder side can determine the HOA coefficient of the first target virtual speaker.

In an embodiment, the method further includes:

encoding the attribute information of the first target virtual speaker, and writing encoded attribute information into the bitstream.

In the foregoing solution, in addition to encoding the virtual speaker, the encoder side may also encode the attribute information of the first target virtual speaker, and write the encoded attribute information of the first target virtual speaker into the bitstream. In this case, the obtained bitstream may include the encoded virtual speaker and the encoded attribute information of the first target virtual speaker. In this embodiment of this application, the bitstream may carry the encoded attribute information of the first target virtual speaker. In this way, a decoder side can determine the attribute information of the first target virtual speaker by decoding the bitstream. This facilitates audio decoding at the decoder side.

In an embodiment, the current scene audio signal includes a to-be-encoded higher order ambisonics HOA signal, and the attribute information of the first target virtual speaker includes the HOA coefficient of the first target virtual speaker; and the generating a first virtual speaker signal based on the current scene audio signal and attribute information of the first target virtual speaker includes:

performing linear combination on the to-be-encoded HOA signal and the HOA coefficient to obtain the first virtual speaker signal.

In the foregoing solution, an example in which the current scene audio signal is the to-be-encoded HOA signal is used. The encoder side first determines the HOA coefficient of the first target virtual speaker. For example, the encoder side selects the HOA coefficient from the HOA coefficient set based on the main sound field component. The selected HOA coefficient is the HOA coefficient of the first target virtual speaker. After the encoder side obtains the to-be-encoded HOA signal and the HOA coefficient of the first target virtual speaker, the first virtual speaker signal may be generated based on the to-be-encoded HOA signal and the HOA coefficient of the first target virtual speaker. The to-be-encoded HOA signal may be obtained by performing linear combination on the HOA coefficient of the first target virtual speaker, and the solution of the first virtual speaker signal may be converted into a solution of linear combination.

In an embodiment, the current scene audio signal includes a to-be-encoded higher order ambisonics HOA signal, and the attribute information of the first target virtual speaker includes the location information of the first target virtual speaker; and the generating a first virtual speaker signal based on the current scene audio signal and attribute information of the first target virtual speaker includes:

obtaining, based on the location information of the first target virtual speaker, the HOA coefficient for the first target virtual speaker; and performing linear combination on the to-be-encoded HOA signal and the HOA coefficient to obtain the first virtual speaker signal.

In the foregoing solution, the attribute information of the first target virtual speaker may include the location information of the first target virtual speaker. The encoder side prestores an HOA coefficient of each virtual speaker in the virtual speaker set, and the encoder side further stores location information of each virtual speaker. There is a correspondence between the location information of the virtual speaker and the HOA coefficient of the virtual speaker. Therefore, the encoder side may determine the HOA coefficient of the first target virtual speaker based on the location information of the first target virtual speaker. If the attribute information includes the HOA coefficient, the encoder side may obtain the HOA coefficient of the first target virtual speaker by decoding the attribute information of the first target virtual speaker.

In an embodiment, the method further includes:

selecting a second target virtual speaker from the virtual speaker set based on the current scene audio signal;

generating a second virtual speaker signal based on the current scene audio signal and attribute information of the second target virtual speaker; and encoding the second virtual speaker signal, and writing an encoded second virtual speaker signal into the bitstream.

In the foregoing solution, the second target virtual speaker is another target virtual speaker that is selected by the encoder side and that is different from the first target virtual encoder. The first scene audio signal is a to-be-encoded audio signal in an original scene, and the second target virtual speaker may be a virtual speaker in the virtual speaker set. For example, the second target virtual speaker may be selected from the preset virtual speaker set according to a preconfigured target virtual speaker selection policy. The target virtual speaker selection policy is a policy of selecting a target virtual speaker matching the first scene audio signal from the virtual speaker set, for example, selecting the second target virtual speaker based on a sound field component obtained by each virtual speaker from the first scene audio signal.

In an embodiment, the method further includes:

performing alignment processing on the first virtual speaker signal and the second virtual speaker signal to obtain an aligned first virtual speaker signal and an aligned second virtual speaker signal;

correspondingly, the encoding the second virtual speaker signal includes:

encoding the aligned second virtual speaker signal; and correspondingly, the encoding the first virtual speaker signal includes:

encoding the aligned first virtual speaker signal.

In the foregoing solution, after obtaining the aligned first virtual speaker signal, the encoder side may encode the aligned first virtual speaker signal. In this embodiment of this application, inter-channel correlation is enhanced by readjusting and realigning channels of the first virtual speaker signal. This facilitates encoding processing performed by the core encoder on the first virtual speaker signal.

In an embodiment, the method further includes:

selecting a second target virtual speaker from the virtual speaker set based on the current scene audio signal; and generating a second virtual speaker signal based on the current scene audio signal and attribute information of the second target virtual speaker; and correspondingly, the encoding the first virtual speaker signal includes:

obtaining a downmixed signal and side information based on the first virtual speaker signal and the second virtual speaker signal, where the side information indicates a relationship between the first virtual speaker signal and the second virtual speaker signal; and encoding the downmixed signal and the side information.

In the foregoing solution, after obtaining the first virtual speaker signal and the second virtual speaker signal, the encoder side may further perform downmix processing based on the first virtual speaker signal and the second virtual speaker signal to generate the downmixed signal, for example, perform amplitude downmix processing on the first virtual speaker signal and the second virtual speaker signal to obtain the downmixed signal. In addition, the side information may be generated based on the first virtual speaker signal and the second virtual speaker signal. The side information indicates the relationship between the first virtual speaker signal and the second virtual speaker signal. The relationship may be implemented in a plurality of manners. The side information may be used by the decoder side to perform upmixing on the downmixed signal, to restore the first virtual speaker signal and the second virtual speaker signal. For example, the side information includes a signal information loss analysis parameter. In this way, the decoder side restores the first virtual speaker signal and the second virtual speaker signal by using the signal information loss analysis parameter.

In an embodiment, the method further includes:

performing alignment processing on the first virtual speaker signal and the second virtual speaker signal to obtain an aligned first virtual speaker signal and an aligned second virtual speaker signal;

correspondingly, the obtaining a downmixed signal and side information based on the first virtual speaker signal and the second virtual speaker signal includes:

obtaining the downmixed signal and the side information based on the aligned first virtual speaker signal and the aligned second virtual speaker signal; and correspondingly, the side information indicates a relationship between the aligned first virtual speaker signal and the aligned second virtual speaker signal.

In the foregoing solution, before generating the downmixed signal, the encoder side may first perform an alignment operation of the virtual speaker signal, and then generate the downmixed signal and the side information after completing the alignment operation. In this embodiment of this application, inter-channel correlation is enhanced by readjusting and realigning channels of the first virtual speaker signal and the second virtual speaker signal. This facilitates encoding processing performed by the core encoder on the first virtual speaker signal.

In an embodiment, before the selecting a second target virtual speaker from the virtual speaker set based on the current scene audio signal, the method further includes:

determining, based on an encoding rate and/or signal type information of the current scene audio signal, whether a target virtual speaker other than the first target virtual speaker needs to be obtained; and selecting the second target virtual speaker from the virtual speaker set based on the current scene audio signal if the target virtual speaker other than the first target virtual speaker needs to be obtained.

In the foregoing solution, the encoder side may further perform signal selection to determine whether the second target virtual speaker needs to be obtained. If the second target virtual speaker needs to be obtained, the encoder side may generate the second virtual speaker signal. If the second target virtual speaker does not need to be obtained, the encoder side may not generate the second virtual speaker signal. The encoder may make a decision based on the configuration information of the audio encoder and/or the signal type information of the first scene audio signal, to determine whether another target virtual speaker needs to be selected in addition to the first target virtual speaker. For example, if the encoding rate is higher than a preset threshold, it is determined that target virtual speakers corresponding to two main sound field components need to be obtained, and in addition to the first target virtual speaker, the second target virtual speaker may further be determined. For another example, if it is determined, based on the signal type information of the first scene audio signal, that target virtual speakers corresponding to two main sound field components whose sound source directions are dominant need to be obtained, in addition to the first target virtual speaker, the second target virtual speaker may be further determined. On the contrary, if it is determined, based on the encoding rate and/or the signal type information of the first scene audio signal, that only one target virtual speaker needs to be obtained, it is determined that the target virtual speaker other than the first target virtual speaker is no longer obtained after the first target virtual speaker is determined. In this embodiment of this application, signal selection is performed to reduce an amount of data to be encoded by the encoder side, and improve encoding efficiency.

According to a second aspect, an embodiment of this application further provides an audio decoding method, including:

receiving a bitstream;

decoding the bitstream to obtain a virtual speaker signal; and obtaining a reconstructed scene audio signal based on attribute information of a target virtual speaker and the virtual speaker signal.

In this embodiment of this application, the bitstream is first received, then the bitstream is decoded to obtain the virtual speaker signal, and finally the reconstructed scene audio signal is obtained based on the attribute information of the target virtual speaker and the virtual speaker signal. In this embodiment of this application, the virtual speaker signal may be obtained by decoding the bitstream, and the reconstructed scene audio signal is obtained based on the attribute information of the target virtual speaker and the virtual speaker signal. In this embodiment of this application, the obtained bitstream carries the virtual speaker signal and a residual signal. This reduces an amount of decoded data and improves decoding efficiency.

In an embodiment, the method further includes:

decoding the bitstream to obtain the attribute information of the target virtual speaker.

In the foregoing solution, in addition to encoding the virtual speaker, an encoder side may also encode the attribute information of the target virtual speaker, and write encoded attribute information of the target virtual speaker into the bitstream. For example, the attribute information of the first target virtual speaker may be obtained by using the bitstream. In this embodiment of this application, the bitstream may carry the encoded attribute information of the first target virtual speaker. In this way, a decoder side can determine the attribute information of the first target virtual speaker by decoding the bitstream. This facilitates audio decoding at the decoder side.

In an embodiment, the attribute information of the target virtual speaker includes a higher order ambisonics HOA coefficient of the target virtual speaker; and the obtaining a reconstructed scene audio signal based on attribute information of a target virtual speaker and the virtual speaker signal includes:

performing synthesis processing on the virtual speaker signal and the HOA coefficient of the target virtual speaker to obtain the reconstructed scene audio signal.

In the foregoing solution, the decoder side first determines the HOA coefficient of the target virtual speaker. For example, the decoder side may prestore the HOA coefficient of the target virtual speaker. After obtaining the virtual speaker signal and the HOA coefficient of the target virtual speaker, the decoder side may obtain the reconstructed scene audio signal based on the virtual speaker signal and the HOA coefficient of the target virtual speaker. In this way, quality of the reconstructed scene audio signal is improved.

In an embodiment, the attribute information of the target virtual speaker includes location information of the target virtual speaker; and the obtaining a reconstructed scene audio signal based on attribute information of a target virtual speaker and the virtual speaker signal includes:

determining an HOA coefficient of the target virtual speaker based on the location information of the target virtual speaker; and performing synthesis processing on the virtual speaker signal and the HOA coefficient of the target virtual speaker to obtain the reconstructed scene audio signal.

In the foregoing solution, the attribute information of the target virtual speaker may include the location information of the target virtual speaker. The decoder side prestores an HOA coefficient of each virtual speaker in the virtual speaker set, and the decoder side further stores location information of each virtual speaker. For example, the decoder side may determine, based on a correspondence between the location information of the virtual speaker and the HOA coefficient of the virtual speaker, the HOA coefficient for the location information of the target virtual speaker, or the decoder side may calculate the HOA coefficient of the target virtual speaker based on the location information of the target virtual speaker. Therefore, the decoder side may determine the HOA coefficient of the target virtual speaker based on the location information of the target virtual speaker. In this way, the decoder side can determine the HOA coefficient of the target virtual speaker.

In an embodiment, the virtual speaker signal is a downmixed signal obtained by downmixing a first virtual speaker signal and a second virtual speaker signal, and the method further includes:

- decoding the bitstream to obtain side information, where the side information indicates a relationship between the first virtual speaker signal and the second virtual speaker signal; and
- obtaining the first virtual speaker signal and the second virtual speaker signal based on the side information and the downmixed signal; and
- correspondingly, the obtaining a reconstructed scene audio signal based on attribute information of a target virtual speaker and the virtual speaker signal includes:
- obtaining the reconstructed scene audio signal based on the attribute information of the target virtual speaker, the first virtual speaker signal, and the second virtual speaker signal.

In the foregoing solution, the encoder side generates the downmixed signal when performing downmix processing based on the first virtual speaker signal and the second virtual speaker signal, and the encoder side may further perform signal compensation for the downmixed signal to generate the side information. The side information may be written into the bitstream, the decoder side may obtain the side information by using the bitstream, and the decoder side may perform signal compensation based on the side information to obtain the first virtual speaker signal and the second virtual speaker signal. Therefore, during signal reconstruction, the first virtual speaker signal, the second virtual speaker signal, and the foregoing attribute information of the target virtual speaker may be used, to improve quality of a decoded signal at the decoder side.

According to a third aspect, an embodiment of this application provides an audio encoding apparatus, including:

- an obtaining module, configured to select a first target virtual speaker from a preset virtual speaker set based on a current scene audio signal;
- a signal generation module, configured to generate a first virtual speaker signal based on the current scene audio signal and attribute information of the first target virtual speaker; and
- an encoding module, configured to encode the first virtual speaker signal to obtain a bitstream.

In an embodiment, the obtaining module is configured to: obtain a main sound field component from the current scene audio signal based on the virtual speaker set; and select the first target virtual speaker from the virtual speaker set based on the main sound field component.

In the third aspect of this application, composition modules of the audio encoding apparatus may further perform the operations described in the first aspect and the possible implementations. For details, refer to the descriptions in the first aspect and the possible implementations.

In an embodiment, the obtaining module is configured to: select an HOA coefficient for the main sound field component from a higher order ambisonics HOA coefficient set based on the main sound field component, where HOA coefficients in the HOA coefficient set are in a one-to-one correspondence with virtual speakers in the virtual speaker set; and determine, as the first target virtual speaker, a virtual speaker that corresponds to the HOA coefficient for the main sound field component and that is in the virtual speaker set.

In an embodiment, the obtaining module is configured to: obtain a configuration parameter of the first target virtual speaker based on the main sound field component; generate, based on the configuration parameter of the first target virtual speaker, an HOA coefficient for the first target virtual speaker; and determine, as the target virtual speaker, a virtual speaker that corresponds to the HOA coefficient for the first target virtual speaker and that is in the virtual speaker set.

In an embodiment, the obtaining module is configured to: determine configuration parameters of a plurality of virtual speakers in the virtual speaker set based on configuration information of an audio encoder; and select the configuration parameter of the first target virtual speaker from the configuration parameters of the plurality of virtual speakers based on the main sound field component.

In an embodiment, the configuration parameter of the first target virtual speaker includes location information and HOA order information of the first target virtual speaker; and

- the obtaining module is configured to determine, based on the location information and the HOA order information of the first target virtual speaker, the HOA coefficient for the first target virtual speaker.

In an embodiment, the encoding module is further configured to encode the attribute information of the first target virtual speaker, and write encoded attribute information into the bitstream.

In an embodiment, the current scene audio signal includes a to-be-encoded HOA signal, and the attribute information of the first target virtual speaker includes the HOA coefficient of the first target virtual speaker; and

- the signal generation module is configured to perform linear combination on the to-be-encoded HOA signal and the HOA coefficient to obtain the first virtual speaker signal.

In an embodiment, the current scene audio signal includes a to-be-encoded higher order ambisonics HOA signal, and the attribute information of the first target virtual speaker includes the location information of the first target virtual speaker; and

- the signal generation module is configured to: obtain, based on the location information of the first target virtual speaker, the HOA coefficient for the first target virtual speaker; and perform linear combination on the to-be-encoded HOA signal and the HOA coefficient to obtain the first virtual speaker signal.

In an embodiment, the obtaining module is configured to select a second target virtual speaker from the virtual speaker set based on the current scene audio signal;

- the signal generation module is configured to generate a second virtual speaker signal based on the current scene audio signal and attribute information of the second target virtual speaker; and
- the encoding module is configured to encode the second virtual speaker signal, and write an encoded second virtual speaker signal into the bitstream.

In an embodiment, the signal generation module is configured to perform alignment processing on the first virtual speaker signal and the second virtual speaker signal to obtain an aligned first virtual speaker signal and an aligned second virtual speaker signal;

- correspondingly, the encoding module is configured to encode the aligned second virtual speaker signal; and correspondingly, the encoding module is configured to encode the aligned first virtual speaker signal.

In an embodiment, the obtaining module is configured to select a second target virtual speaker from the virtual speaker set based on the current scene audio signal;

the signal generation module is configured to generate a second virtual speaker signal based on the current scene audio signal and attribute information of the second target virtual speaker; and correspondingly, the encoding module is configured to obtain a downmixed signal and side information based on the first virtual speaker signal and the second virtual speaker signal, where the side information indicates a relationship between the first virtual speaker signal and the second virtual speaker signal; and encode the downmixed signal and the side information.

In an embodiment, the signal generation module is configured to perform alignment processing on the first virtual speaker signal and the second virtual speaker signal to obtain an aligned first virtual speaker signal and an aligned second virtual speaker signal;

correspondingly, the encoding module is configured to obtain the downmixed signal and the side information based on the aligned first virtual speaker signal and the aligned second virtual speaker signal; and correspondingly, the side information indicates a relationship between the aligned first virtual speaker signal and the aligned second virtual speaker signal.

In an embodiment, the obtaining module is configured to: before the selecting a second target virtual speaker from the virtual speaker set based on the current scene audio signal, determine, based on an encoding rate and/or signal type information of the current scene audio signal, whether a target virtual speaker other than the first target virtual speaker needs to be obtained; and select the second target virtual speaker from the virtual speaker set based on the current scene audio signal if the target virtual speaker other than the first target virtual speaker needs to be obtained.

According to a fourth aspect, an embodiment of this application provides an audio decoding apparatus, including:

a receiving module, configured to receive a bitstream;

a decoding module, configured to decode the bitstream to obtain a virtual speaker signal; and a reconstruction module, configured to obtain a reconstructed scene audio signal based on attribute information of a target virtual speaker and the virtual speaker signal.

In an embodiment, the decoding module is further configured to decode the bitstream to obtain the attribute information of the target virtual speaker.

In an embodiment, the attribute information of the target virtual speaker includes a higher order ambisonics HOA coefficient of the target virtual speaker; and the reconstruction module is configured to perform synthesis processing on the virtual speaker signal and the HOA coefficient of the target virtual speaker to obtain the reconstructed scene audio signal.

In an embodiment, the attribute information of the target virtual speaker includes location information of the target virtual speaker; and the reconstruction module is configured to determine an HOA coefficient of the target virtual speaker based on the location information of the target virtual speaker; and perform synthesis processing on the virtual speaker signal and the HOA coefficient of the target virtual speaker to obtain the reconstructed scene audio signal.

In an embodiment, the virtual speaker signal is a downmixed signal obtained by downmixing a first virtual speaker signal and a second virtual speaker signal, and the apparatus further includes a signal compensation module, where the decoding module is configured to decode the bitstream to obtain side information, where the side information indicates a relationship between the first virtual speaker signal and the second virtual speaker signal;

the signal compensation module is configured to obtain the first virtual speaker signal and the second virtual speaker signal based on the side information and the downmixed signal; and correspondingly, the reconstruction module is configured to obtain the reconstructed scene audio signal based on the attribute information of the target virtual speaker, the first virtual speaker signal, and the second virtual speaker signal.

In the fourth aspect of this application, composition modules of the audio decoding apparatus may further perform the operations described in the second aspect and the possible implementations. For details, refer to the descriptions in the second aspect and the possible implementations.

According to a fifth aspect, an embodiment of this application provides a computer-readable storage medium. The computer-readable storage medium stores instructions. When the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communication apparatus. The communication apparatus may include an entity such as a terminal device or a chip. The communication apparatus includes a processor. In an embodiment, the communication apparatus further includes a memory. The memory is configured to store instructions. The processor is configured to execute the instructions in the memory, to enable the communication apparatus to perform the method according to any one of the first aspect or the second aspect.

According to an eighth aspect, this application provides a chip system. The chip system includes a processor, configured to support an audio encoding apparatus or an audio decoding apparatus in implementing functions in the foregoing aspects, for example, sending or processing data and/or information in the foregoing methods. In a possible design, the chip system further includes a memory, and the memory is configured to store program instructions and data that are necessary for the audio encoding apparatus or the audio decoding apparatus. The chip system may include a chip, or may include a chip and another discrete component.

According to a ninth aspect, this application provides a computer-readable storage medium, including a bitstream generated by using the method according to any one of the implementations of the first aspect.

DETAILED DESCRIPTION

Embodiments of this application provide an audio encoding and decoding method and apparatus, to reduce an amount of data of an audio signal in an encoding scene, and improve encoding and decoding efficiency.

The following describes embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "have" and any variant thereof are intended to cover non-exclusive inclusion, so that a process, method, system, product, or device that includes a series of units is not necessarily limited to those units, but may include other units not expressly listed or inherent to such a process, method, product, or device.

Figure 1:
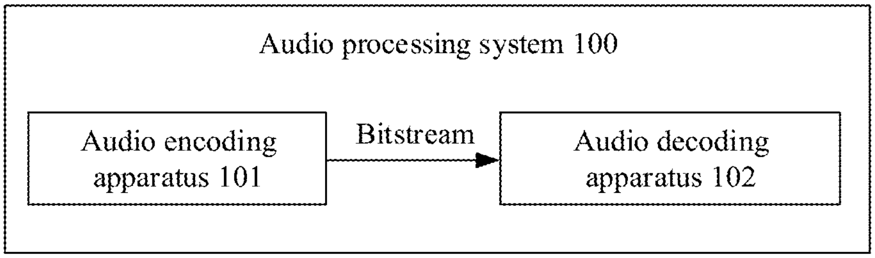
FIG. 1 is a schematic diagram of a composition structure of an audio processing system according to an embodiment of this application.

Technical solutions in embodiments of this application may be applied to various audio processing systems. FIG. 1 is a schematic diagram of a composition structure of an audio processing system according to an embodiment of this application. The audio processing system 100 may include an audio encoding apparatus 101 and an audio decoding apparatus 102. The audio encoding apparatus 101 may be configured to generate a bitstream, and then the audio encoded bitstream may be transmitted to the audio decoding apparatus 102 through an audio transmission channel. The audio decoding apparatus 102 may receive the bitstream, and then perform an audio decoding function of the audio decoding apparatus 102, to finally obtain a reconstructed signal.

In embodiments of this application, the audio encoding apparatus may be applied to various terminal devices that have an audio communication requirement, and a wireless device and a core network device that have a transcoding requirement. For example, the audio encoding apparatus may be an audio encoder of the foregoing terminal device, wireless device, or core network device. Similarly, the audio decoding apparatus may be applied to various terminal devices that have an audio communication requirement, and a wireless device and a core network device that have a transcoding requirement. For example, the audio decoding apparatus may be an audio decoder of the foregoing terminal device, wireless device, or core network device. For example, the audio encoder may include a radio access network, a media gateway of a core network, a transcoding device, a media resource server, a mobile terminal, a fixed network terminal, and the like. The audio encoder may further be an audio codec applied to a virtual reality (VR) technology streaming media (streaming) service.

In this embodiment of this application, an audio encoding and decoding module (audio encoding and audio decoding) applicable to a virtual reality streaming media (VR streaming) service is used as an example. An end-to-end audio signal processing procedure includes: A preprocessing operation (audio preprocessing) is performed on an audio signal A after the audio signal A passes through an acquisition module (acquisition). The preprocessing operation includes filtering out a low frequency part in the signal by using 20 Hz or 50 Hz as a demarcation point. Orientation information in the signal is extracted. After encoding processing (audio encoding) and encapsulation (file/segment encapsulation), the audio signal is delivered (delivery) to a decoder side. The decoder side first performs decapsulation (file/segment decapsulation), and then decoding (audio decoding). Binaural rendering (audio rendering) processing is performed on the decoded signal, and a rendered signal is mapped to headphones (headphones) of a listener. The headphone may be an independent headphone or may be a headphone on a glasses device.

Figure 2A:
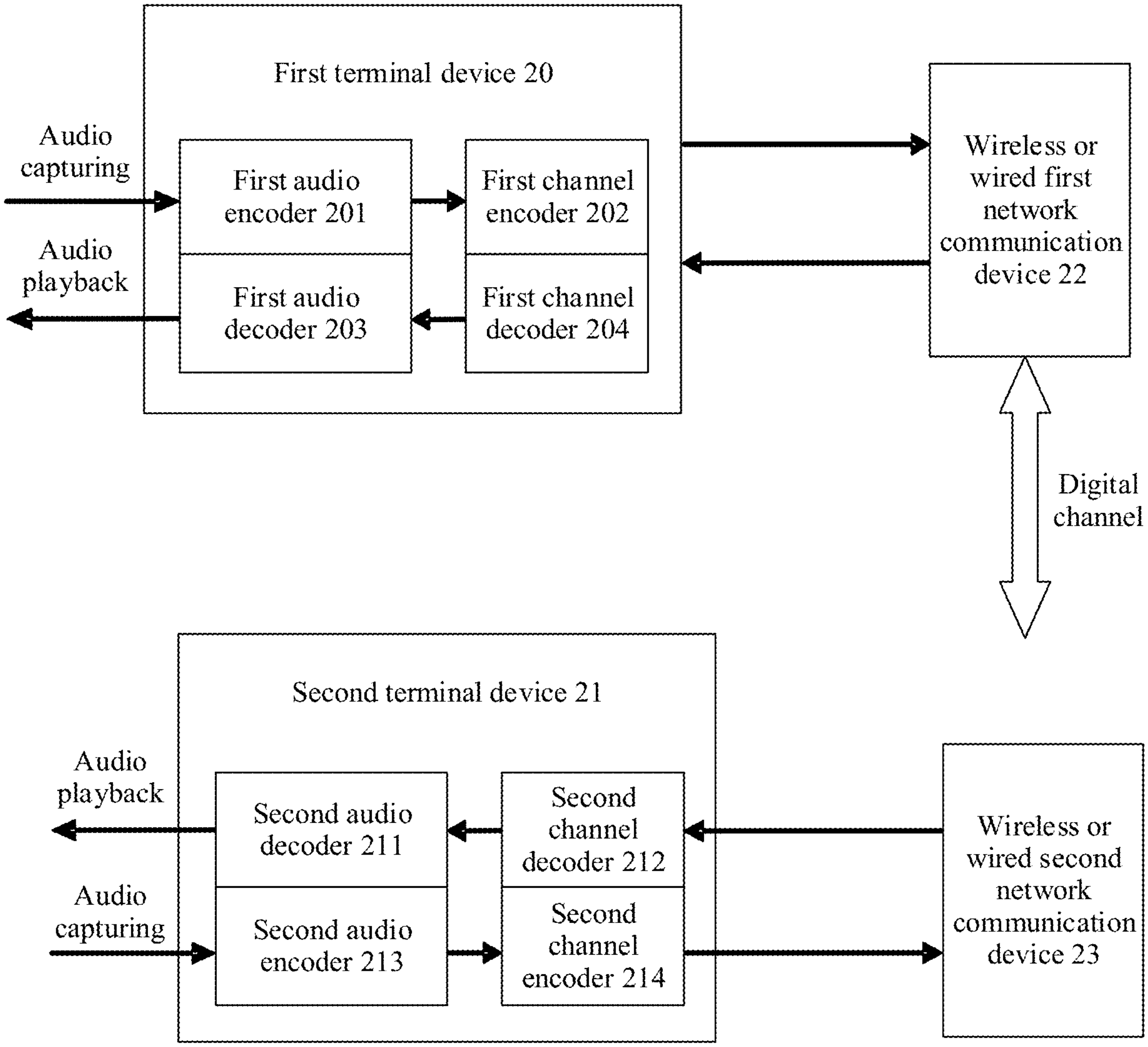
FIG. 2*a* is a schematic diagram of application of an audio encoder and an audio decoder to a terminal device according to an embodiment of this application.

FIG. 2*a* is a schematic diagram of application of an audio encoder and an audio decoder to a terminal device according to an embodiment of this application. Each terminal device may include an audio encoder, a channel encoder, an audio decoder, and a channel decoder. In an embodiment, the channel encoder is configured to perform channel encoding on an audio signal, and the channel decoder is configured to perform channel decoding on the audio signal. For example, a first terminal device 20 may include a first audio encoder 201, a first channel encoder 202, a first audio decoder 203, and a first channel decoder 204. A second terminal device 21 may include a second audio decoder 211, a second channel decoder 212, a second audio encoder 213, and a second channel encoder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data switching device.

In audio communication, a terminal device serving as a transmit end first acquires audio, performs audio encoding on an acquired audio signal, and then performs channel encoding, and transmits the audio signal on a digital channel by using a wireless network or a core network. A terminal device serving as a receive end performs channel decoding based on a received signal to obtain a bitstream, and then restores the audio signal through audio decoding. The terminal device serving as the receive end performs audio playback.

Figure 2B:
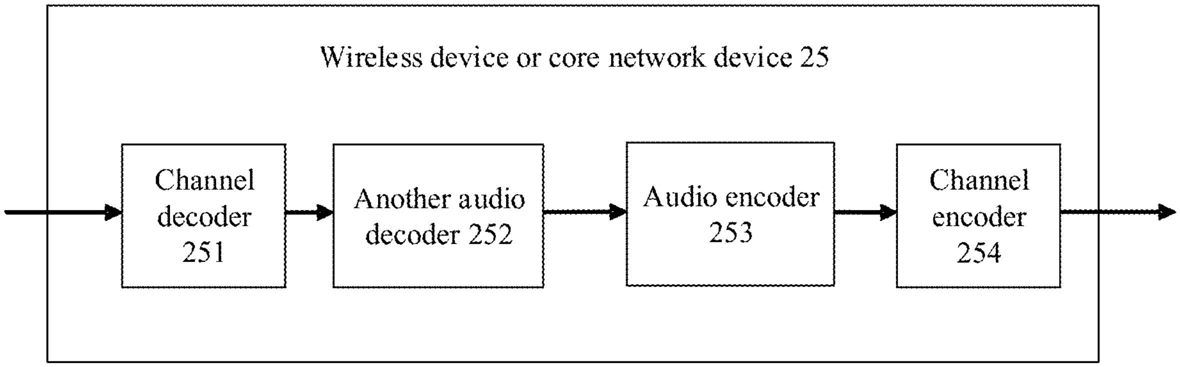
FIG. 2*b* is a schematic diagram of application of an audio encoder to a wireless device or a core network device according to an embodiment of this application.

FIG. 2*b* is a schematic diagram of application of an audio encoder to a wireless device or a core network device according to an embodiment of this application. The wireless device or the core network device 25 includes a channel decoder 251, another audio decoder 252, an audio encoder 253 provided in this embodiment of this application, and a channel encoder 254. The another audio decoder 252 is an audio decoder other than the audio decoder 253. In the wireless device or the core network device 25, a signal entering the device is first channel decoded by using the channel decoder 251, then audio decoding is performed by using the another audio decoder 252, and then audio encoding is performed by using the audio encoder 253 provided in this embodiment of this application. Finally, the audio signal is channel encoded by using the channel encoder 254, and then transmitted after channel encoding is completed. The another audio decoder 252 performs audio decoding on a bitstream decoded by the channel decoder 251.

Figure 2C:
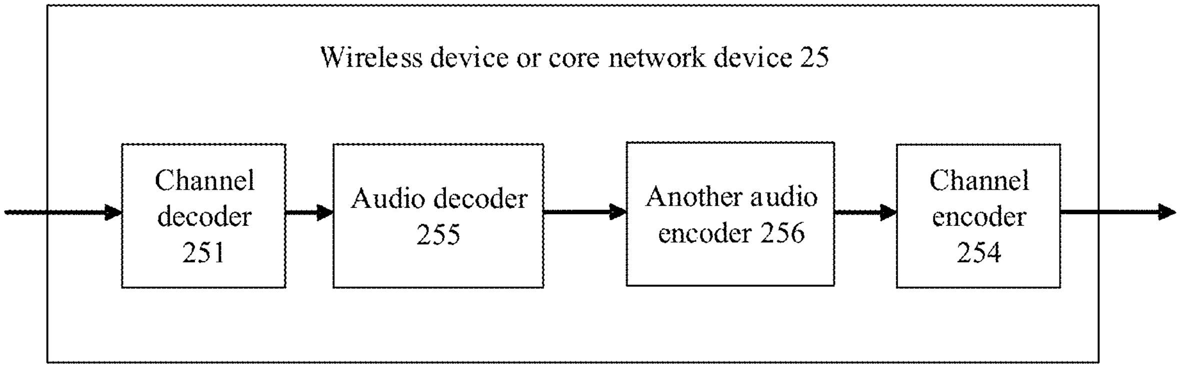
FIG. 2*c* is a schematic diagram of application of an audio decoder to a wireless device or a core network device according to an embodiment of this application.

FIG. 2*c* is a schematic diagram of application of an audio decoder to a wireless device or a core network device according to an embodiment of this application. The wireless device or the core network device 25 includes a channel decoder 251, an audio decoder 255 provided in this embodiment of this application, another audio encoder 256, and a channel encoder 254. The another audio encoder 256 is another audio encoder other than the audio encoder 255. In the wireless device or the core network device 25, a signal entering the device is first channel decoded by using the channel decoder 251, then a received audio encoded bitstream is decoded by using the audio decoder 255, and then audio encoding is performed by using the another audio encoder 256. Finally, the audio signal is channel encoded by using the channel encoder 254, and then transmitted after channel encoding is completed. In the wireless device or the core network device, if transcoding needs to be implemented, corresponding audio encoding and decoding processing needs to be performed. The wireless device is a radio frequency-related device in communication, and the core network device is a core network-related device in communication.

In some embodiments of this application, the audio encoding apparatus may be applied to various terminal devices that have an audio communication requirement, and a wireless device and a core network device that have a transcoding requirement. For example, the audio encoding apparatus may be a multi-channel encoder of the foregoing terminal device, wireless device, or core network device. Similarly, the audio decoding apparatus may be applied to various terminal devices that have an audio communication requirement, and a wireless device and a core network device that have a transcoding requirement. For example, the audio decoding apparatus may be multi-channel decoder of the foregoing terminal device, wireless device, or core network device.

Figure 3A:
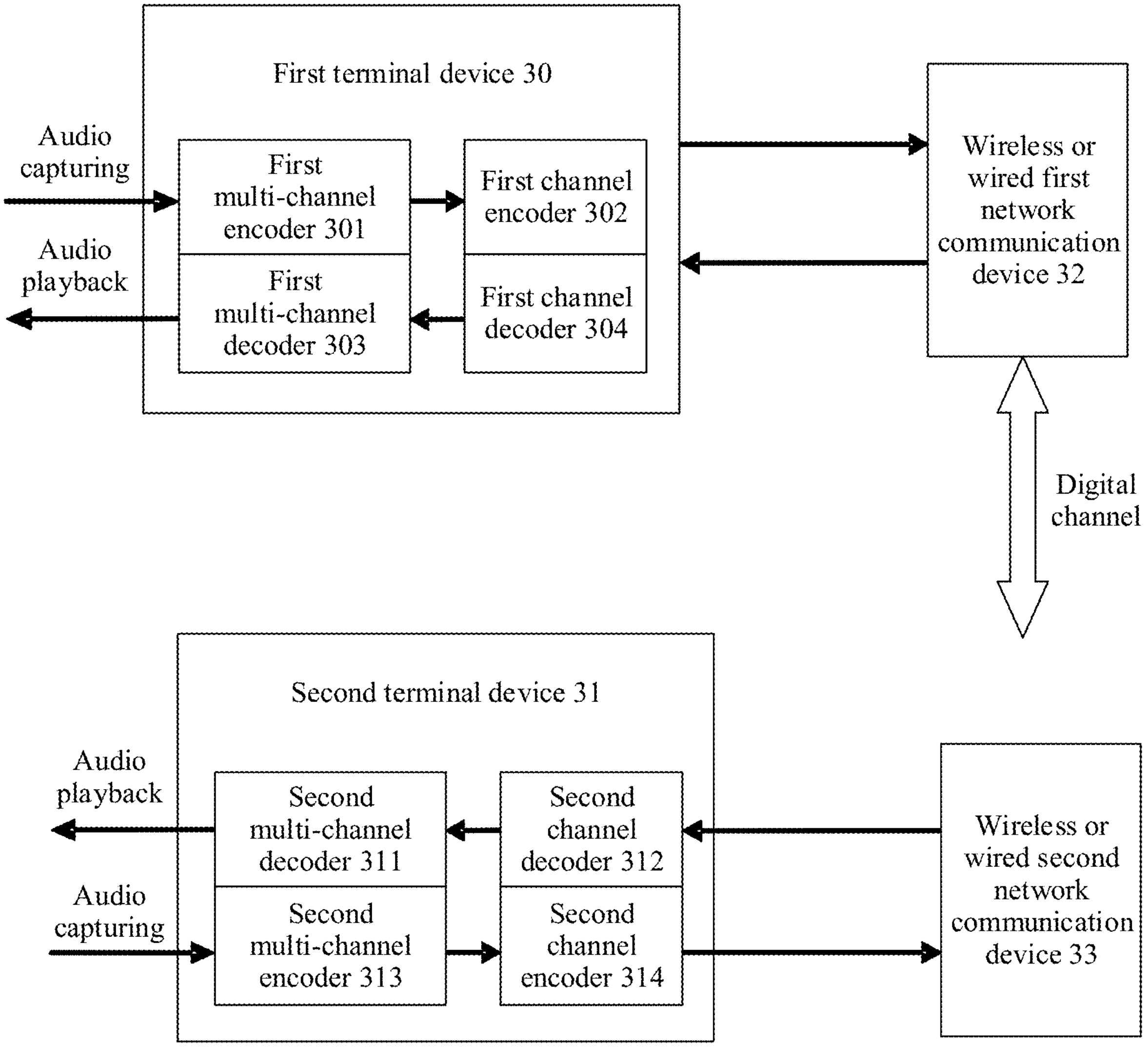
FIG. 3*a* is a schematic diagram of application of a multi-channel encoder and a multi-channel decoder to a terminal device according to an embodiment of this application.

FIG. 3*a* is a schematic diagram of application of a multi-channel encoder and a multi-channel decoder to a terminal device according to an embodiment of this application. Each terminal device may include a multi-channel encoder, a channel encoder, a multi-channel decoder, and a channel decoder. The multi-channel encoder may perform an audio encoding method provided in this embodiment of this application, and the multi-channel decoder may perform an audio decoding method provided in this embodiment of this application. In an embodiment, the channel encoder is used to perform channel encoding on a multi-channel signal, and the channel decoder is used to perform channel decoding on a multi-channel signal. For example, a first terminal device 30 may include a first multi-channel encoder 301, a first channel encoder 302, a first multi-channel decoder 303, and a first channel decoder 304. A second terminal device 31 may include a second multi-channel decoder 311, a second channel decoder 312, a second multi-channel encoder 313, and a second channel encoder 314. The first terminal device 30 is connected to a wireless or wired first network communication device 32, the first network communication device 32 is connected to a wireless or wired second network communication device 33 through a digital channel, and the second terminal device 31 is connected to the wireless or wired second network communication device 33. The wireless or wired network communication device may be a signal transmission device in general, for example, a communication base station or a data switching device. In audio communication, a terminal device serving as a transmit end performs multi-channel encoding on an acquired multi-channel signal, then performs channel encoding, and transmits the multi-channel signal on a digital channel by using a wireless network or a core network. A terminal device serving as a receive end performs channel decoding based on a received signal to obtain a multi-channel signal encoded bitstream, and then restores a multi-channel signal through multi-channel decoding, and the terminal device serving as the receive end performs playback.

Figure 3B:
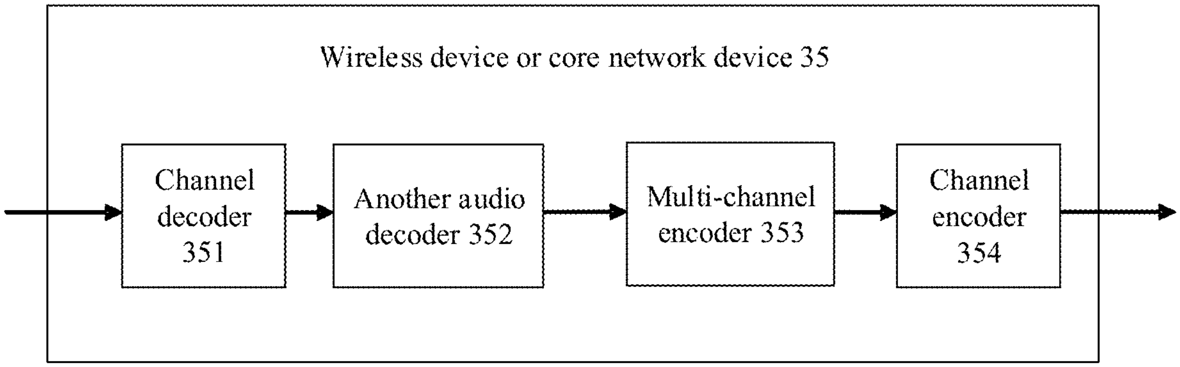
FIG. 3*b* is a schematic diagram of application of a multi-channel encoder to a wireless device or a core network device according to an embodiment of this application.

FIG. 3*b* is a schematic diagram of application of a multi-channel encoder to a wireless device or a core network device according to an embodiment of this application. The wireless device or core network device 35 includes: a channel decoder 351, another audio decoder 352, a multi-channel encoder 353, and a channel encoder 354. FIG. 3*b* is similar to FIG. 2*b*, and details are not described herein again.

Figure 3C:
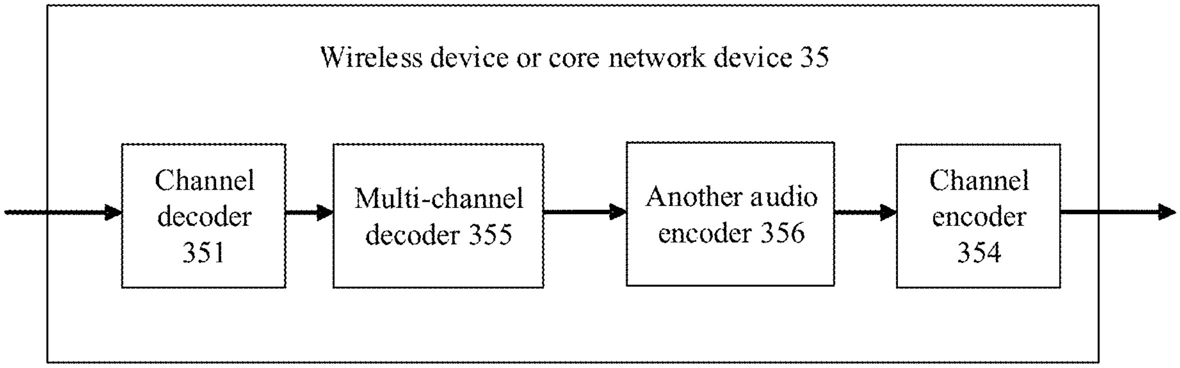
FIG. 3*c* is a schematic diagram of application of a multi-channel decoder to a wireless device or a core network device according to an embodiment of this application.

FIG. 3*c* is a schematic diagram of application of a multi-channel decoder to a wireless device or a core network device according to an embodiment of this application. The wireless device or core network device 35 includes: a channel decoder 351, a multi-channel decoder 355, another audio encoder 356, and a channel encoder 354. FIG. 3*c* is similar to FIG. 2*c*, and details are not described herein again.

Audio encoding processing may be a part of a multi-channel encoder, and audio decoding processing may be a part of a multi-channel decoder. For example, performing multi-channel encoding on an acquired multi-channel signal may be: processing the acquired multi-channel signal to obtain an audio signal, and then encoding the obtained audio signal according to the method provided in this embodiment of this application. A decoder side performs decoding based on a multi-channel signal encoded bitstream to obtain an audio signal, and restores the multi-channel signal after upmix processing. Therefore, embodiments of this application may also be applied to a multi-channel encoder and a multi-channel decoder in a terminal device, a wireless device, or a core network device. In a wireless device or a core network device, if transcoding needs to be implemented, corresponding multi-channel encoding and decoding processing needs to be performed.

Figure 4:
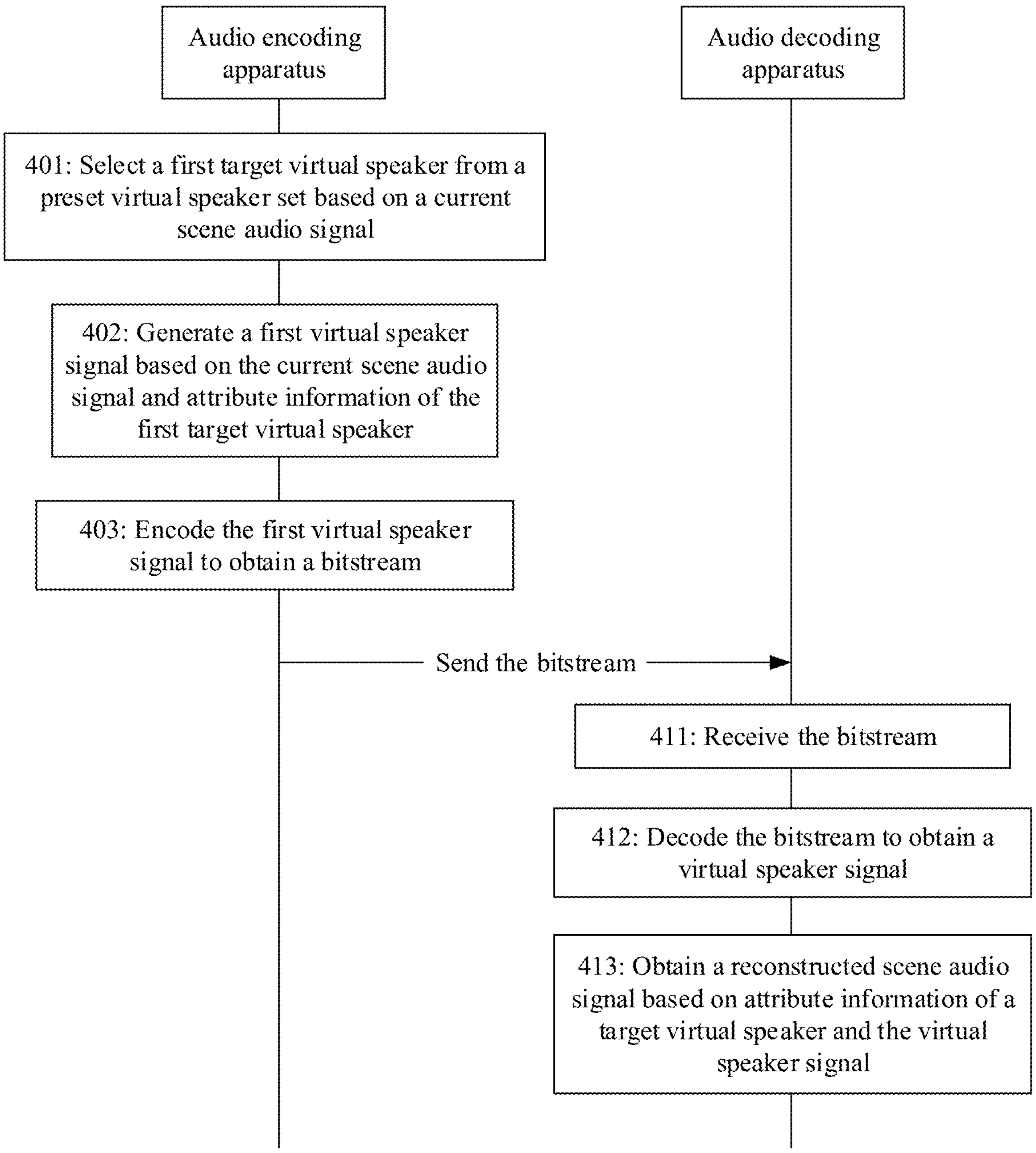
FIG. 4 is a schematic flowchart of interaction between an audio encoding apparatus and an audio decoding apparatus according to an embodiment of this application.

An audio encoding and decoding method provided in embodiments of this application may include an audio encoding method and an audio decoding method. The audio encoding method is performed by an audio encoding apparatus, the audio decoding method is performed by an audio decoding apparatus, and the audio encoding apparatus and the audio decoding apparatus may communicate with each other. The following describes, based on the foregoing system architecture, the audio encoding apparatus, and the audio decoding apparatus, the audio encoding method and the audio decoding method that are provided in embodiments of this application. FIG. 4 is a schematic flowchart of interaction between an audio encoding apparatus and an audio decoding apparatus according to an embodiment of this application. The following operation 401 to operation 403 may be performed by the audio encoding apparatus (hereinafter referred to as an encoder side), and the following operation 411 to operation 413 may be performed by the audio decoding apparatus (hereinafter referred to as a decoder side). The following process is mainly included.

401: Select a first target virtual speaker from a preset virtual speaker set based on a current scene audio signal.

The encoder side obtains the current scene audio signal. The current scene audio signal is an audio signal obtained by acquiring a sound field at a location in which a microphone is located in space, and the current scene audio signal may also be referred to as an audio signal in an original scene. For example, the current scene audio signal may be an audio signal obtained by using a higher order ambisonics (HOA) technology.

In this embodiment of this application, the encoder side may preconfigure a virtual speaker set. The virtual speaker set may include a plurality of virtual speakers. During actual playback of a scene audio signal, the scene audio signal may be played back by using a headphone, or may be played back by using a plurality of speakers arranged in a room. When the speaker is used for playback, a basic method is to superimpose signals of a plurality of speakers. In this way, under a specific standard, a sound field at a point (a location of a listener) in space is as close as possible to an original sound field when a scene audio signal is recorded. In this embodiment of this application, the virtual speaker is used for calculating a playback signal corresponding to the scene audio signal, the playback signal is used as a transmission signal, and a compressed signal is further generated. The virtual speaker represents a speaker that virtually exists in a spatial sound field, and the virtual speaker may implement playback of a scene audio signal at the encoder side.

In this embodiment of this application, the virtual speaker set includes a plurality of virtual speakers, and each of the plurality of virtual speakers corresponds to a virtual speaker configuration parameter (configuration parameter for short). The virtual speaker configuration parameter includes but is not limited to information such as a quantity of virtual speakers, an HOA order of the virtual speaker, and location coordinates of the virtual speaker. After obtaining the virtual speaker set, the encoder side selects the first target virtual speaker from the preset virtual speaker set based on the current scene audio signal. The current scene audio signal is a to-be-encoded an audio signal in an original scene, and the first target virtual speaker may be a virtual speaker in the virtual speaker set. For example, the first target virtual speaker may be selected from the preset virtual speaker set according to a preconfigured target virtual speaker selection policy. The target virtual speaker selection policy is a policy of selecting a target virtual speaker matching the current scene audio signal from the virtual speaker set, for example, selecting the first target virtual speaker based on a sound field component obtained by each virtual speaker from the current scene audio signal. For another example, the first target virtual speaker is selected from the current scene audio signal based on location information of each virtual speaker. The first target virtual speaker is a virtual speaker that is in the virtual speaker set and that is used for playing back the current scene audio signal, that is, the encoder side may select, from the virtual speaker set, a target virtual encoder that can play back the current scene audio signal.

In this embodiment of this application, after the first target virtual speaker is selected in operation 401, a subsequent processing process for the first target virtual speaker, for example, subsequent operation 402 and operation 403, may be performed. This is not limited herein. In this embodiment of this application, in addition to the first target virtual speaker, more target virtual speakers may also be selected. For example, a second target virtual speaker may be selected. For the second target virtual speaker, a process similar to the subsequent operation 402 and operation 403 also needs to be performed. For details, refer to descriptions in the following embodiments.

In this embodiment of this application, after the encoder side selects the first target virtual speaker, the encoder side may further obtain attribute information of the first target virtual speaker. The attribute information of the first target virtual speaker includes information related to an attribute of the first target virtual speaker. The attribute information may be set based on a specific application scene. For example, the attribute information of the first target virtual speaker includes location information of the first target virtual speaker or an HOA coefficient of the first target virtual speaker. The location information of the first target virtual speaker may be a spatial distribution location of the first target virtual speaker, or may be information about a location of the first target virtual speaker in the virtual speaker set relative to another virtual speaker. This is not limited herein. Each virtual speaker in the virtual speaker set corresponds to an HOA coefficient, and the HOA coefficient may also be referred to as an ambisonic coefficient. The following describes the HOA coefficient for the virtual speaker.

For example, the HOA order may be one of 2 to 10 orders, a signal sampling rate during audio signal recording is 48 to 192 kilohertz (kHz), and a sampling depth is 16 or 24 bits (bit). An HOA signal may be generated based on the HOA coefficient of the virtual speaker and the scene audio signal. The HOA signal is characterized by spatial information with a sound field, and the HOA signal is information describing a specific precision of a sound field signal at a specific point in space. Therefore, it may be considered that another representation form is used for describing a sound field signal at a location point. In this description method, a signal at a spatial location point can be described with a same precision by using a smaller amount of data, to implement signal compression. The spatial sound field can be decomposed into superimposition of a plurality of plane waves. Therefore, theoretically, a sound field expressed by the HOA signal may be expressed by using superimposition of the plurality of plane waves, and each plane wave is represented by using a one-channel audio signal and a direction vector.

The representation form of plane wave superimposition can accurately express the original sound field by using fewer channels, to implement signal compression.

In some embodiments of this application, in addition to the foregoing operation 401 performed by the encoder side, the audio encoding method provided in this embodiment of this application further includes the following operations:

A1: Obtain a main sound field component from the current scene audio signal based on the virtual speaker set.

The main sound field component in operation A1 may also be referred to as a first main sound field component.

In a scenario in which operation A1 is performed, the selecting a first target virtual speaker from a preset virtual speaker set based on a current scene audio signal in the foregoing operation 401 includes:

B1: Select the first target virtual speaker from the virtual speaker set based on the main sound field component.

The encoder side obtains the virtual speaker set, and the encoder side performs signal decomposition on the current scene audio signal by using the virtual speaker set, to obtain the main sound field component corresponding to the current scene audio signal. The main sound field component represents an audio signal corresponding to a main sound field in the current scene audio signal. For example, the virtual speaker set includes a plurality of virtual speakers, and a plurality of sound field components may be obtained from the current scene audio signal based on the plurality of virtual speakers, that is, each virtual speaker may obtain one sound field component from the current scene audio signal, and then a main sound field component is selected from the plurality of sound field components. For example, the main sound field component may be one or several sound field components with a maximum value among the plurality of sound field components, or the main sound field component may be one or several sound field components with a dominant direction among the plurality of sound field components. Each virtual speaker in the virtual speaker set corresponds to a sound field component, and the first target virtual speaker is selected from the virtual speaker set based on the main sound field component. For example, a virtual speaker corresponding to the main sound field component is the first target virtual speaker selected by the encoder side. In this embodiment of this application, the encoder side may select the first target virtual speaker based on the main sound field component. In this way, the encoder side can determine the first target virtual speaker.

In this embodiment of this application, the encoder side may select the first target virtual speaker in a plurality of manners. For example, the encoder side may preset a virtual speaker at a specified location as the first target virtual speaker, that is, select, based on a location of each virtual speaker in the virtual speaker set, a virtual speaker that meets the specified location as the first target virtual speaker. This is not limited herein.

In some embodiments of this application, the selecting the first target virtual speaker from the virtual speaker set based on the main sound field component in the foregoing operation B1 includes:

selecting an HOA coefficient for the main sound field component from a higher order ambisonics HOA coefficient set based on the main sound field component, where HOA coefficients in the HOA coefficient set are in a one-to-one correspondence with virtual speakers in the virtual speaker set; and determining, as the first target virtual speaker, a virtual speaker that corresponds to the HOA coefficient for the main sound field component and that is in the virtual speaker set.

The encoder side preconfigures the HOA coefficient set based on the virtual speaker set, and there is a one-to-one correspondence between the HOA coefficients in the HOA coefficient set and the virtual speakers in the virtual speaker set. Therefore, after the HOA coefficient is selected based on the main sound field component, the virtual speaker set is searched for, based on the one-to-one correspondence, a target virtual speaker corresponding to the HOA coefficient for the main sound field component. The found target virtual speaker is the first target virtual speaker. In this way, the encoder side can determine the first target virtual speaker. For example, the HOA coefficient set includes an HOA coefficient 1, an HOA coefficient 2, and an HOA coefficient 3, and the virtual speaker set includes a virtual speaker 1, a virtual speaker 2, and a virtual speaker 3. The HOA coefficients in the HOA coefficient set are in a one-to-one correspondence with the virtual speakers in the virtual speaker set. For example, the HOA coefficient 1 corresponds to the virtual speaker 1, the HOA coefficient 2 corresponds to the virtual speaker 2, and the HOA coefficient 3 corresponds to the virtual speaker 3. If the HOA coefficient 3 is selected from the HOA coefficient set based on the main sound field component, it may be determined that the first target virtual speaker is the virtual speaker 3.

In some embodiments of this application, the selecting the first target virtual speaker from the virtual speaker set based on the main sound field component in the foregoing operation B1 further includes:

C1: Obtain a configuration parameter of the first target virtual speaker based on the main sound field component.

C2: Generate, based on the configuration parameter of the first target virtual speaker, an HOA coefficient for the first target virtual speaker.

C3: Determine, as the first target virtual speaker, a virtual speaker that corresponds to the HOA coefficient for the first target virtual speaker and that is in the virtual speaker set.

After obtaining the main sound field component, the encoder side may be used for determining the configuration parameter of the first target virtual speaker based on the main sound field component. For example, the main sound field component is one or several sound field components with a maximum value among a plurality of sound field components, or the main sound field component may be one or several sound field components with a dominant direction among a plurality of sound field components. The main sound field component may be used for determining the first target virtual speaker matching the current scene audio signal, the corresponding attribute information is configured for the first target virtual speaker, and the HOA coefficient of the first target virtual speaker may be generated based on the configuration parameter of the first target virtual speaker. A process of generating the HOA coefficient may be implemented according to an HOA algorithm, and details are not described herein. Each virtual speaker in the virtual speaker set corresponds to an HOA coefficient. Therefore, the first target virtual speaker may be selected from the virtual speaker set based on the HOA coefficient for each virtual speaker. In this way, the encoder side can determine the first target virtual speaker.

In some embodiments of this application, the obtaining a configuration parameter of the first target virtual speaker based on the main sound field component in operation C1 includes:

determining configuration parameters of a plurality of virtual speakers in the virtual speaker set based on configuration information of an audio encoder; and selecting the configuration parameter of the first target virtual speaker from the configuration parameters of the plurality of virtual speakers based on the main sound field component.

The audio encoder may prestore respective configuration parameters of the plurality of virtual speakers. The configuration parameter of each virtual speaker may be determined based on the configuration information of the audio encoder. The audio encoder is the foregoing encoder side. The configuration information of the audio encoder includes but is not limited to: an HOA order, an encoding bit rate, and the like. The configuration information of the audio encoder may be used for determining a quantity of virtual speakers and a location parameter of each virtual speaker. In this way, the encoder side can determine a configuration parameter of a virtual speaker. For example, if the encoding bit rate is low, a small quantity of virtual speakers may be configured; if the encoding bit rate is high, a plurality of virtual speakers may be configured. For another example, an HOA order of the virtual speaker may be equal to the HOA order of the audio encoder. In this embodiment of this application, in addition to determining the respective configuration parameters of the plurality of virtual speakers based on the configuration information of the audio encoder, the respective configuration parameters of the plurality of virtual speakers may be further determined based on user-defined information. For example, a user may define a location of the virtual speaker, an HOA order, a quantity of virtual speakers, and the like. This is not limited herein.

The encoder side obtains the configuration parameters of the plurality of virtual speakers from the virtual speaker set. For each virtual speaker, there is a corresponding configuration parameter for the virtual speaker, and the configuration parameter of each virtual speaker includes but is not limited to information such as an HOA order of the virtual speaker and location coordinates of the virtual speaker. An HOA coefficient of each virtual speaker may be generated based on the configuration parameter of the virtual speaker, and a process of generating the HOA coefficient may be implemented according to an HOA algorithm, and details are not described herein again. One HOA coefficient is separately generated for each virtual speaker in the virtual speaker set, and HOA coefficients separately configured for all virtual speakers in the virtual speaker set form the HOA coefficient set. In this way, the encoder side can determine an HOA coefficient of each virtual speaker in the virtual speaker set.

In some embodiments of this application, the configuration parameter of the first target virtual speaker includes location information and HOA order information of the first target virtual speaker; and the generating, based on the configuration parameter of the first target virtual speaker, an HOA coefficient for the first target virtual speaker in the foregoing operation C2 includes:

determining, based on the location information and the HOA order information of the first target virtual speaker, the HOA coefficient for the first target virtual speaker.

The configuration parameter of each virtual speaker in the virtual speaker set may include location information of the virtual speaker and HOA order information of the virtual speaker. Similarly, the configuration parameter of the first target virtual speaker includes the location information and the HOA order information of the first target virtual speaker. For example, the location information of each virtual speaker in the virtual speaker set may be determined based on a local equidistant virtual speaker space distribution manner. The local equidistant virtual speaker space distribution manner refers to that a plurality of virtual speakers are distributed in space in a local equidistant manner. For example, the local equidistant may include: evenly distributed or unevenly distributed. The HOA coefficient of each virtual speaker may be generated based on the location information and the HOA order information of the virtual speaker, and a process of generating the HOA coefficient may be implemented according to an HOA algorithm. In this way, the encoder side can determine the HOA coefficient of the first target virtual speaker.

In addition, in this embodiment of this application, a group of HOA coefficients is separately generated for each virtual speaker in the virtual speaker set, and a plurality of groups of HOA coefficients form the foregoing HOA coefficient set. The HOA coefficients separately configured for all the virtual speakers in the virtual speaker set form the HOA coefficient set. In this way, the encoder side can determine an HOA coefficient of each virtual speaker in the virtual speaker set.

402: Generate a first virtual speaker signal based on the current scene audio signal and the attribute information of the first target virtual speaker.

After the encoder side obtains the current scene audio signal and the attribute information of the first target virtual speaker, the encoder side may play back the current scene audio signal, and the encoder side generates the first virtual speaker signal based on the current scene audio signal and the attribute information of the first target virtual speaker. The first virtual speaker signal is a playback signal of the current scene audio signal. The attribute information of the first target virtual speaker describes the information related to the attribute of the first target virtual speaker. The first target virtual speaker is a virtual speaker that is selected by the encoder side and that can play back the current scene audio signal. Therefore, the current scene audio signal is played back based on the attribute information of the first target virtual speaker, to obtain the first virtual speaker signal. A data amount of the first virtual speaker signal is irrelevant to a quantity of channels of the current scene audio signal, and the data amount of the first virtual speaker signal is related to the first target virtual speaker. For example, in this embodiment of this application, compared with the current scene audio signal, the first virtual speaker signal is represented by using fewer channels. For example, the current scene audio signal is a third-order HOA signal, and the HOA signal is 16-channel. In this embodiment of this application, the 16 channels may be compressed into two channels, that is, the virtual speaker signal generated by the encoder side is two-channel. For example, the virtual speaker signal generated by the encoder side may include the foregoing first virtual speaker signal and second virtual speaker signal, a quantity of channels of the virtual speaker signal generated by the encoder side is irrelevant to a quantity of channels of a first scene audio signal. It may be learned from the description of the subsequent operations that, a bitstream may carry a two-channel first virtual speaker signal. Correspondingly, the decoder side receives the bitstream, decodes the bitstream to obtain the two-channel virtual speaker signal, and the decoder side may reconstruct 16-channel scene audio signal based on the two-channel virtual speaker signal. In addition, it is ensured that the reconstructed scene audio signal has the same subjective and objective quality as the audio signal in the original scene.

It may be understood that the foregoing operation 401 and operation 402 may be implemented by a spatial encoder of a moving picture experts group (MPEG).

In some embodiments of this application, the current scene audio signal may include a to-be-encoded HOA signal, and the attribute information of the first target virtual speaker includes the HOA coefficient of the first target virtual speaker; and the generating a first virtual speaker signal based on the current scene audio signal and the attribute information of the first target virtual speaker in operation 402 includes:

performing linear combination on the to-be-encoded HOA signal and the HOA coefficient of the first target virtual speaker to obtain the first virtual speaker signal.

For example, the current scene audio signal is the to-be-encoded HOA signal. The encoder side first determines the HOA coefficient of the first target virtual speaker. For example, the encoder side selects the HOA coefficient from the HOA coefficient set based on the main sound field component. The selected HOA coefficient is the HOA coefficient of the first target virtual speaker. After the encoder side obtains the to-be-encoded HOA signal and the HOA coefficient of the first target virtual speaker, the first virtual speaker signal may be generated based on the to-be-encoded HOA signal and the HOA coefficient of the first target virtual speaker. The to-be-encoded HOA signal may be obtained by performing linear combination on the HOA coefficient of the first target virtual speaker, and the solution of the first virtual speaker signal may be converted into a solution of linear combination.

For example, the attribute information of the first target virtual speaker may include the HOA coefficient of the first target virtual speaker. The encoder side may obtain the HOA coefficient of the first target virtual speaker by decoding the attribute information of the first target virtual speaker. The encoder side performs linear combination on the to-be-encoded HOA signal and the HOA coefficient of the first target virtual speaker, that is, the encoder side combines the to-be-encoded HOA signal and the HOA coefficient of the first target virtual speaker together to obtain a linear combination matrix. Then, the encoder side may perform optimal solution on the linear combination matrix, and an obtained optimal solution is the first virtual speaker signal. The optimal solution is related to an algorithm used for solving the linear combination matrix. In this embodiment of this application, the encoder side can generate the first virtual speaker signal.

In some embodiments of this application, the current scene audio signal includes a to-be-encoded higher order ambisonics HOA signal, and the attribute information of the first target virtual speaker includes the location information of the first target virtual speaker; and the generating a first virtual speaker signal based on the current scene audio signal and the attribute information of the first target virtual speaker in operation 402 includes:

obtaining, based on the location information of the first target virtual speaker, the HOA coefficient for the first target virtual speaker; and performing linear combination on the to-be-encoded HOA signal and the HOA coefficient for the first target virtual speaker to obtain the first virtual speaker signal.

The attribute information of the first target virtual speaker may include the location information of the first target virtual speaker. The encoder side prestores an HOA coefficient of each virtual speaker in the virtual speaker set, and the encoder side further stores location information of each virtual speaker. There is a correspondence between the location information of the virtual speaker and the HOA coefficient of the virtual speaker. Therefore, the encoder side may determine the HOA coefficient of the first target virtual speaker based on the location information of the first target virtual speaker. If the attribute information includes the HOA coefficient, the encoder side may obtain the HOA coefficient of the first target virtual speaker by decoding the attribute information of the first target virtual speaker.

After the encoder side obtains the to-be-encoded HOA signal and the HOA coefficient of the first target virtual speaker, the encoder side performs linear combination on the to-be-encoded HOA signal and the HOA coefficient of the first target virtual speaker, that is, the encoder side combines the to-be-encoded HOA signal and the HOA coefficient of the first target virtual speaker together to obtain a linear combination matrix. Then, the encoder side may perform optimal solution on the linear combination matrix, and an obtained optimal solution is the first virtual speaker signal.

For example, the HOA coefficient of the first target virtual speaker is represented by a matrix A, and the to-be-encoded HOA signal may be obtained through linear combination by using the matrix A. A theoretical optimal solution w may be obtained by using a least square method, that is, the first virtual speaker signal. For example, the following calculation formula may be used:

$$w=A^{-1}X.$$

$A^{-1}$ represents an inverse matrix of the matrix A, a size of the matrix A is (M×C), C is a quantity of first target virtual speakers, M is a quantity of channels of N-order HOA coefficient, and a represents the HOA coefficient of the first target virtual speaker. For example, $$A=\begin{bmatrix} a_{11} & \dots & a_{1C} \\ \vdots & \ddots & \vdots \\ a_{M1} & \dots & a_{MC} \end{bmatrix}.$$

X represents the to-be-encoded HOA signal, a size of the matrix X is (M×L), M is the quantity of channels of N-order HOA coefficient, L is a quantity of sampling points, and x represents a coefficient of the to-be-encoded HOA signal. For example, $$X=\begin{bmatrix} x_{11} & \dots & x_{1L} \\ \vdots & \ddots & \vdots \\ x_{M1} & \dots & x_{ML} \end{bmatrix}.$$

403: Encode the virtual speaker signal to obtain a bitstream.

In this embodiment of this application, after the encoder side generates the first virtual speaker signal, the encoder side may encode the first virtual speaker signal to obtain the bitstream. For example, the encoder side may be a core encoder, and the core encoder encodes the first virtual speaker signal to obtain the bitstream. The bitstream may also be referred to as an audio signal encoded bitstream. In this embodiment of this application, the encoder side encodes the first virtual speaker signal instead of encoding the scene audio signal. The first target virtual speaker is selected, so that a sound field at a location in which a listener is located in space is as close as possible to an original sound field when the scene audio signal is recorded. This ensures encoding quality of the encoder side. In addition, an amount of encoded data of the first virtual speaker signal is irrelevant to a quantity of channels of the scene audio signal. This reduces an amount of data of the encoded scene audio signal and improves encoding and decoding efficiency.

In some embodiments of this application, after the encoder side performs the foregoing operation 401 to operation 403, the audio encoding method provided in this embodiment of this application further includes the following operations:

encoding the attribute information of the first target virtual speaker, and writing encoded attribute information into the bitstream.

In addition to encoding the virtual speaker, the encoder side may also encode the attribute information of the first target virtual speaker, and write the encoded attribute information of the first target virtual speaker into the bitstream. In this case, the obtained bitstream may include the encoded virtual speaker and the encoded attribute information of the first target virtual speaker. In this embodiment of this application, the bitstream may carry the encoded attribute information of the first target virtual speaker. In this way, the decoder side can determine the attribute information of the first target virtual speaker by decoding the bitstream. This facilitates audio decoding at the decoder side.

It should be noted that the foregoing operation 401 to operation 403 describe a process of generating the first virtual speaker signal based on the first target virtual speaker and performing signal encoding based on the first virtual speaker when the first target speaker is selected from the virtual speaker set. In this embodiment of this application, in addition to the first target virtual speaker, the encoder side may also select more target virtual speakers. For example, the encoder side may further select a second target virtual speaker. For the second target virtual speaker, a process similar to the foregoing operation 402 and operation 403 also needs to be performed. This is not limited herein. Details are described below.

In some embodiments of this application, in addition to the foregoing operations performed by the encoder side, the audio encoding method provided in this embodiment of this application further includes:

D1: Select a second target virtual speaker from the virtual speaker set based on the first scene audio signal.

D2: Generate a second virtual speaker signal based on the first scene audio signal and attribute information of the second target virtual speaker.

D3: Encode the second virtual speaker signal, and write an encoded second virtual speaker signal into the bitstream.

An embodiment of operation D1 is similar to that of the foregoing operation 401. The second target virtual speaker is another target virtual speaker that is selected by the encoder side and that is different from a first target virtual encoder. The first scene audio signal is a to-be-encoded audio signal in an original scene, and the second target virtual speaker may be a virtual speaker in the virtual speaker set. For example, the second target virtual speaker may be selected from the preset virtual speaker set according to a preconfigured target virtual speaker selection policy. The target virtual speaker selection policy is a policy of selecting a target virtual speaker matching the first scene audio signal from the virtual speaker set, for example, selecting the second target virtual speaker based on a sound field component obtained by each virtual speaker from the first scene audio signal.

In some embodiments of this application, the audio encoding method provided in this embodiment of this application further includes the following operations:

E1: Obtain a second main sound field component from the first scene audio signal based on the virtual speaker set.

In a scenario in which operation E1 is performed, the selecting a second target virtual speaker from the preset virtual speaker set based on the first scene audio signal in the foregoing in operation D1 includes:

F1: Select the second target virtual speaker from the virtual speaker set based on the second main sound field component.

The encoder side obtains the virtual speaker set, and the encoder side performs signal decomposition on the first scene audio signal by using the virtual speaker set, to obtain the second main sound field component corresponding to the first scene audio signal. The second main sound field component represents an audio signal corresponding to a main sound field in the first scene audio signal. For example, the virtual speaker set includes a plurality of virtual speakers, and a plurality of sound field components may be obtained from the first scene audio signal based on the plurality of virtual speakers, that is, each virtual speaker may obtain one sound field component from the first scene audio signal, and then the second main sound field component is selected from the plurality of sound field components. For example, the second main sound field component may be one or several sound field components with a maximum value among the plurality of sound field components, or the second main sound field component may be one or several sound field components with a dominant direction among the plurality of sound field components. The second target virtual speaker is selected from the virtual speaker set based on the second main sound field component. For example, a virtual speaker corresponding to the second main sound field component is the second target virtual speaker selected by the encoder side. In this embodiment of this application, the encoder side may select the second target virtual speaker based on the main sound field component. In this way, the encoder side can determine the second target virtual speaker.

In some embodiments of this application, the selecting the second target virtual speaker from the virtual speaker set based on the second main sound field component in the foregoing operation F1 includes:

selecting, based on the second main sound field component, an HOA coefficient for the second main sound field component from a HOA coefficient set, where HOA coefficients in the HOA coefficient set are in a one-to-one correspondence with virtual speakers in the virtual speaker set; and determining, as the second target virtual speaker, a virtual speaker that corresponds to the HOA coefficient for the second main sound field component and that is in the virtual speaker set.

The foregoing embodiment is similar to the process of determining the first target virtual speaker in the foregoing embodiment, and details are not described herein again.

In some embodiments of this application, the selecting the second target virtual speaker from the virtual speaker set based on the second main sound field component in the foregoing operation F1 further includes:

G1: Obtain a configuration parameter of the second target virtual speaker based on the second main sound field component.

G2: Generate, based on the configuration parameter of the second target virtual speaker, an HOA coefficient for the second target virtual speaker.

G3: Determine, as the second target virtual speaker, a virtual speaker that corresponds to the HOA coefficient for the second target virtual speaker and that is in the virtual speaker set.

The foregoing embodiment is similar to the process of determining the first target virtual speaker in the foregoing embodiment, and details are not described herein again.

In some embodiments of this application, the obtaining a configuration parameter of the second target virtual speaker based on the second main sound field component in operation G1 includes:

determining configuration parameters of a plurality of virtual speakers in the virtual speaker set based on configuration information of an audio encoder; and selecting the configuration parameter of the second target virtual speaker from the configuration parameters of the plurality of virtual speakers based on the second main sound field component.

The foregoing embodiment is similar to the process of determining the configuration parameter of the first target virtual speaker in the foregoing embodiment, and details are not described herein again.

In some embodiments of this application, the configuration parameter of the second target virtual speaker includes location information and HOA order information of the second target virtual speaker.

The generating, based on the configuration parameter of the second target virtual speaker, an HOA coefficient for the second target virtual speaker in the foregoing operation G2 includes:

determining, based on the location information and the HOA order information of the second target virtual speaker, the HOA coefficient for the second target virtual speaker.

The foregoing embodiment is similar to the process of determining the HOA coefficient for the first target virtual speaker in the foregoing embodiment, and details are not described herein again.

In some embodiments of this application, the first scene audio signal includes a to-be-encoded HOA signal, and the attribute information of the second target virtual speaker includes the HOA coefficient of the second target virtual speaker; and the generating a second virtual speaker signal based on the first scene audio signal and attribute information of the second target virtual speaker in operation D2 includes:

performing linear combination on the to-be-encoded HOA signal and the HOA coefficient of the second target virtual speaker to obtain the second virtual speaker signal.

In some embodiments of this application, the first scene audio signal includes a to-be-encoded higher order ambisonics HOA signal, and the attribute information of the second target virtual speaker includes the location information of the second target virtual speaker; and the generating a second virtual speaker signal based on the first scene audio signal and attribute information of the second target virtual speaker in operation D2 includes:

obtaining, based on the location information of the second target virtual speaker, the HOA coefficient for the second target virtual speaker; and performing linear combination on the to-be-encoded HOA signal and the HOA coefficient for the second target virtual speaker to obtain the second virtual speaker signal.

The foregoing embodiment is similar to the process of determining the first virtual speaker signal in the foregoing embodiment, and details are not described herein again.

In this embodiment of this application, after the encoder side generates the second virtual speaker signal, the encoder side may further perform operation D3 to encode the second virtual speaker signal, and write the encoded second virtual speaker signal into the bitstream. The encoding method used by the encoder side is similar to operation 403. In this way, the bitstream may carry an encoding result of the second virtual speaker signal.

In some embodiments of this application, the audio encoding method performed by the encoder side may further include the following operation:

I1: Perform alignment processing on the first virtual speaker signal and the second virtual speaker signal to obtain an aligned first virtual speaker signal and an aligned second virtual speaker signal.

In a scenario in which operation I1 is performed, correspondingly, the encoding the second virtual speaker signal in operation D3 includes:

encoding the aligned second virtual speaker signal; and correspondingly, the encoding the first virtual speaker signal in operation 403 includes:

encoding the aligned first virtual speaker signal.

The encoder side may generate the first virtual speaker signal and the second virtual speaker signal, and the encoder side may perform alignment processing on the first virtual speaker signal and the second virtual speaker signal to obtain the aligned first virtual speaker signal and the aligned second virtual speaker signal. For example, there are two virtual speaker signals. A channel sequence of virtual speaker signals of a current frame is 1 and 2, respectively corresponding to virtual speaker signals generated by target virtual speakers P1 and P2. A channel sequence of virtual speaker signals of a previous frame is 1 and 2, respectively corresponding to virtual speaker signals generated by target virtual speakers P2 and P1. In this case, the channel sequence of the virtual speaker signals of the current frame may be adjusted based on the sequence of the target virtual speakers of the previous frame. For example, the channel sequence of the virtual speaker signals of the current frame is adjusted to 2 and 1, so that the virtual speaker signals generated by the same target virtual speaker are on the same channel.

After obtaining the aligned first virtual speaker signal, the encoder side may encode the aligned first virtual speaker signal. In this embodiment of this application, inter-channel correlation is enhanced by readjusting and realigning channels of the first virtual speaker signal. This facilitates encoding processing performed by the core encoder on the first virtual speaker signal.

In some embodiments of this application, in addition to the foregoing operations performed by the encoder side, the audio encoding method provided in this embodiment of this application further includes:

D1: Select a second target virtual speaker from the virtual speaker set based on the first scene audio signal.

D2: Generate a second virtual speaker signal based on the first scene audio signal and attribute information of the second target virtual speaker.

Correspondingly, in a scenario in which the encoder side performs operation D1 and operation D2, the encoding the first virtual speaker signal in operation 403 includes:

J1: Obtain a downmixed signal and side information based on the first virtual speaker signal and the second virtual speaker signal, where the side information indicates a relationship between the first virtual speaker signal and the second virtual speaker signal.

J2: Encode the downmixed signal and the side information.

After obtaining the first virtual speaker signal and the second virtual speaker signal, the encoder side may further perform downmix processing based on the first virtual speaker signal and the second virtual speaker signal to generate the downmixed signal, for example, perform amplitude downmix processing on the first virtual speaker signal and the second virtual speaker signal to obtain the downmixed signal. In addition, the side information may be generated based on the first virtual speaker signal and the second virtual speaker signal. The side information indicates the relationship between the first virtual speaker signal and the second virtual speaker signal. The relationship may be implemented in a plurality of manners. The side information may be used by the decoder side to perform upmixing on the downmixed signal, to restore the first virtual speaker signal and the second virtual speaker signal. For example, the side information includes a signal information loss analysis parameter. In this way, the decoder side restores the first virtual speaker signal and the second virtual speaker signal by using the signal information loss analysis parameter. For another example, the side information may be a correlation parameter between the first virtual speaker signal and the second virtual speaker signal, for example, may be an energy ratio parameter between the first virtual speaker signal and the second virtual speaker signal. In this way, the decoder side restores the first virtual speaker signal and the second virtual speaker signal by using the correlation parameter or the energy ratio parameter.

In some embodiments of this application, in a scenario in which the encoder side performs operation D1 and operation D2, the encoder side may further perform the following operations:

I1: Perform alignment processing on the first virtual speaker signal and the second virtual speaker signal to obtain an aligned first virtual speaker signal and an aligned second virtual speaker signal.

In a scenario in which operation I1 is performed, correspondingly, the obtaining a downmixed signal and side information based on the first virtual speaker signal and the second virtual speaker signal in operation J1 includes:

obtaining the downmixed signal and the side information based on the aligned first virtual speaker signal and the aligned second virtual speaker signal; and correspondingly, the side information indicates a relationship between the aligned first virtual speaker signal and the aligned second virtual speaker signal.

Before generating the downmixed signal, the encoder side may first perform an alignment operation of the virtual speaker signal, and then generate the downmixed signal and the side information after completing the alignment operation. In this embodiment of this application, inter-channel correlation is enhanced by readjusting and realigning channels of the first virtual speaker signal and the second virtual speaker. This facilitates encoding processing performed by the core encoder on the first virtual speaker signal.

It should be noted that in the foregoing embodiment of this application, the second scene audio signal may be obtained based on the first virtual speaker signal before alignment and the second virtual speaker signal before alignment, or may be obtained based on the aligned first virtual speaker signal and the aligned second virtual speaker signal. The embodiment depends on an application scenario. This is not limited herein.

In some embodiments of this application, before the selecting a second target virtual speaker from the virtual speaker set based on the first scene audio signal in operation D1, the audio signal encoding method provided in this embodiment of this application further includes:

K1: Determine, based on an encoding rate and/or signal type information of the first scene audio signal, whether a target virtual speaker other than the first target virtual speaker needs to be obtained.

K2: Select the second target virtual speaker from the virtual speaker set based on the first scene audio signal if the target virtual speaker other than the first target virtual speaker needs to be obtained.

The encoder side may further perform signal selection to determine whether the second target virtual speaker needs to be obtained. If the second target virtual speaker needs to be obtained, the encoder side may generate the second virtual speaker signal. If the second target virtual speaker does not need to be obtained, the encoder side may not generate the second virtual speaker signal. The encoder may make a decision based on the configuration information of the audio encoder and/or the signal type information of the first scene audio signal, to determine whether another target virtual speaker needs to be selected in addition to the first target virtual speaker. For example, if the encoding rate is higher than a preset threshold, it is determined that target virtual speakers corresponding to two main sound field components need to be obtained, and in addition to the first target virtual speaker, the second target virtual speaker may further be determined. For another example, if it is determined, based on the signal type information of the first scene audio signal, that target virtual speakers corresponding to two main sound field components whose sound source directions are dominant need to be obtained, in addition to the first target virtual speaker, the second target virtual speaker may be further determined. On the contrary, if it is determined, based on the encoding rate and/or the signal type information of the first scene audio signal, that only one target virtual speaker needs to be obtained, it is determined that the target virtual speaker other than the first target virtual speaker is no longer obtained after the first target virtual speaker is determined. In this embodiment of this application, signal selection is performed to reduce an amount of data to be encoded by the encoder side, and improve encoding efficiency.

When performing signal selection, the encoder side may determine whether the second virtual speaker signal needs to be generated. Because information loss occurs when the encoder side performs signal selection, signal compensation needs to be performed on a virtual speaker signal that is not transmitted. Signal compensation may be selected and is not limited to information loss analysis, energy compensation, envelope compensation, noise compensation, and the like. A compensation method may be linear compensation, nonlinear compensation, or the like. After signal compensation is performed, the side information may be generated, and the side information may be written into the bitstream. Therefore, the decoder side may obtain the side information by using the bitstream. The decoder side may perform signal compensation based on the side information, to improve quality of a decoded signal at the decoder side.

According to the example described in the foregoing embodiment, the first virtual speaker signal may be generated based on the first scene audio signal and the attribute information of the first target virtual speaker, and the audio encoder side encodes the first virtual speaker signal instead of directly encoding the first scene audio signal. In this embodiment of this application, the first target virtual speaker is selected based on the first scene audio signal, and the first virtual speaker signal generated based on the first target virtual speaker may represent a sound field at a location in which a listener is located in space, the sound field at this location is as close as possible to an original sound field when the first scene audio signal is recorded. This ensures encoding quality of the audio encoder side. In addition, the first virtual speaker signal and a residual signal are encoded to obtain the bitstream. An amount of encoded data of the first virtual speaker signal is related to the first target virtual speaker, and is irrelevant to a quantity of channels of the first scene audio signal. This reduces the amount of encoded data and improves encoding efficiency.

In this embodiment of this application, the encoder side encodes the virtual speaker signal to generate the bitstream. Then, the encoder side may output the bitstream, and send the bitstream to the decoder side through an audio transmission channel. The decoder side performs subsequent operation 411 to operation 413.

411: Receive the bitstream.

The decoder side receives the bitstream from the encoder side. The bitstream may carry the encoded first virtual speaker signal. The bitstream may further carry the encoded attribute information of the first target virtual speaker. This is not limited herein. It should be noted that the bitstream may not carry the attribute information of the first target virtual speaker. In this case, the decoder side may determine the attribute information of the first target virtual speaker through preconfiguration.

In addition, in some embodiments of this application, when the encoder side generates the second virtual speaker signal, the bitstream may further carry the second virtual speaker signal. The bitstream may further carry the encoded attribute information of the second target virtual speaker. This is not limited herein. It should be noted that the bitstream may not carry the attribute information of the second target virtual speaker. In this case, the decoder side may determine the attribute information of the second target virtual speaker through preconfiguration.

412: Decode the bitstream to obtain a virtual speaker signal.

After receiving the bitstream from the encoder side, the decoder side decodes the bitstream to obtain the virtual speaker signal from the bitstream.

It should be noted that the virtual speaker signal may be the foregoing first virtual speaker signal, or may be the foregoing first virtual speaker signal and second virtual speaker signal. This is not limited herein.

In some embodiments of this application, after the decoder side performs the foregoing operation 411 and operation 412, the audio decoding method provided in this embodiment of this application further includes the following operations:

decoding the bitstream to obtain the attribute information of the target virtual speaker.

In addition to encoding the virtual speaker, the encoder side may also encode the attribute information of the target virtual speaker, and write encoded attribute information of the target virtual speaker into the bitstream. For example, the attribute information of the first target virtual speaker may be obtained by using the bitstream. In this embodiment of this application, the bitstream may carry the encoded attribute information of the first target virtual speaker. In this way, the decoder side can determine the attribute information of the first target virtual speaker by decoding the bitstream. This facilitates audio decoding at the decoder side.

413: Obtain a reconstructed scene audio signal based on attribute information of a target virtual speaker and the virtual speaker signal.

The decoder side may obtain the attribute information of the target virtual speaker. The target virtual speaker is a virtual speaker that is in the virtual speaker set and that is used for playing back the reconstructed scene audio signal. The attribute information of the target virtual speaker may include location information of the target virtual speaker and an HOA coefficient of the target virtual speaker. After obtaining the virtual speaker signal, the decoder side reconstructs the signal based on the attribute information of the target virtual speaker, and may output the reconstructed scene audio signal through signal reconstruction.

In some embodiments of this application, the attribute information of the target virtual speaker includes the HOA coefficient of the target virtual speaker; and the obtaining a reconstructed scene audio signal based on attribute information of a target virtual speaker and the virtual speaker signal in operation 413 includes:

performing synthesis processing on the virtual speaker signal and the HOA coefficient of the target virtual speaker to obtain the reconstructed scene audio signal.

The decoder side first determines the HOA coefficient of the target virtual speaker. For example, the decoder side may prestore the HOA coefficient of the target virtual speaker. After obtaining the virtual speaker signal and the HOA coefficient of the target virtual speaker, the decoder side may obtain the reconstructed scene audio signal based on the virtual speaker signal and the HOA coefficient of the target virtual speaker. In this way, quality of the reconstructed scene audio signal is improved.

For example, the HOA coefficient of the target virtual speaker is represented by a matrix A', a size of the matrix A' is (M×C), C is a quantity of target virtual speakers, and M is a quantity of channels of N-order HOA coefficient. The virtual speaker signal is represented by a matrix W', a size of the matrix W' is (C×L), and L is a quantity of signal sampling points. The reconstructed HOA signal is obtained according to the following calculation formula:

$$H=A'W'.$$

H obtained by using the foregoing calculation formula is the reconstructed HOA signal.

In some embodiments of this application, the attribute information of the target virtual speaker includes the location information of the target virtual speaker; and the obtaining a reconstructed scene audio signal based on attribute information of a target virtual speaker and the virtual speaker signal in operation 413 includes:

determining an HOA coefficient of the target virtual speaker based on the location information of the target virtual speaker; and performing synthesis processing on the virtual speaker signal and the HOA coefficient of the target virtual speaker to obtain the reconstructed scene audio signal.

The attribute information of the target virtual speaker may include the location information of the target virtual speaker. The decoder side prestores an HOA coefficient of each virtual speaker in the virtual speaker set, and the decoder side further stores location information of each virtual speaker. For example, the decoder side may determine, based on a correspondence between the location information of the virtual speaker and the HOA coefficient of the virtual speaker, the HOA coefficient for the location information of the target virtual speaker, or the decoder side may calculate the HOA coefficient of the target virtual speaker based on the location information of the target virtual speaker. Therefore, the decoder side may determine the HOA coefficient of the target virtual speaker based on the location information of the target virtual speaker. In this way, the decoder side can determine the HOA coefficient of the target virtual speaker.

In some embodiments, it can be learned from the method description of the encoder side that the virtual speaker signal is a downmixed signal obtained by downmixing the first virtual speaker signal and the second virtual speaker signal. In this embodiment, the audio decoding method provided in this embodiment of this application further includes:

decoding the bitstream to obtain side information, where the side information indicates a relationship between the first virtual speaker signal and the second virtual speaker signal; and obtaining the first virtual speaker signal and the second virtual speaker signal based on the side information and the downmixed signal.

In this embodiment of the present invention, the relationship between the first virtual speaker signal and the second virtual speaker signal may be a direct relationship, or may be an indirect relationship. For example, when the relationship between the first virtual speaker signal and the second virtual speaker signal is a direct relationship, first side information may include a correlation parameter between the first virtual speaker signal and the second virtual speaker signal, for example, may be an energy ratio parameter between the first virtual speaker signal and the second virtual speaker signal. For example, when the relationship between the first virtual speaker signal and the second virtual speaker signal is an indirect relationship, the first side information may include a correlation parameter between the first virtual speaker signal and the downmixed signal, and a correlation parameter between the second virtual speaker signal and the downmixed signal, for example, include an energy ratio parameter between the first virtual speaker signal and the downmixed signal, and an energy ratio parameter between the second virtual speaker signal and the downmixed signal.

When the relationship between the first virtual speaker signal and the second virtual speaker signal may be a direct relationship, the decoder side may determine the first virtual speaker signal and the second virtual speaker signal based on the downmixed signal, an obtaining manner of the downmixed signal, and the direct relationship. When the relationship between the first virtual speaker signal and the second virtual speaker signal may be an indirect relationship, the decoder side may determine the first virtual speaker signal and the second virtual speaker signal based on the downmixed signal and the indirect relationship.

Correspondingly, the obtaining a reconstructed scene audio signal based on attribute information of a target virtual speaker and the virtual speaker signal in operation 413 includes:

obtaining the reconstructed scene audio signal based on the attribute information of the target virtual speaker, the first virtual speaker signal, and the second virtual speaker signal.

The encoder side generates the downmixed signal when performing downmix processing based on the first virtual speaker signal and the second virtual speaker signal, and the encoder side may further perform signal compensation for the downmixed signal to generate the side information. The side information may be written into the bitstream, the decoder side may obtain the side information by using the bitstream, and the decoder side may perform signal compensation based on the side information to obtain the first virtual speaker signal and the second virtual speaker signal. Therefore, during signal reconstruction, the first virtual speaker signal, the second virtual speaker signal, and the foregoing attribute information of the target virtual speaker may be used, to improve quality of a decoded signal at the decoder side.

According to the example described in the foregoing embodiment, in this embodiment of this application, the virtual speaker signal may be obtained by decoding the bitstream, and the virtual speaker signal is used as a playback signal of a scene audio signal. The reconstructed scene audio signal is obtained based on the attribute information of the target virtual speaker and the virtual speaker signal. In this embodiment of this application, the obtained bitstream carries the virtual speaker signal and a residual signal. This reduces an amount of decoded data and improves decoding efficiency.

For example, in this embodiment of this application, compared with the first scene audio signal, the first virtual speaker signal is represented by using fewer channels. For example, the first scene audio signal is a third-order HOA signal, and the HOA signal is 16-channel. In this embodiment of this application, the 16 channels may be compressed into two channels, that is, the virtual speaker signal generated by the encoder side is two-channel. For example, the virtual speaker signal generated by the encoder side may include the foregoing first virtual speaker signal and second virtual speaker signal, a quantity of channels of the virtual speaker signal generated by the encoder side is irrelevant to a quantity of channels of the first scene audio signal. It may be learned from the description of the subsequent operations that, the bitstream may carry a two-channel virtual speaker signal. Correspondingly, the decoder side receives the bitstream, decodes the bitstream to obtain the two-channel virtual speaker signal, and the decoder side may reconstruct 16-channel scene audio signal based on the two-channel virtual speaker signal. In addition, it is ensured that the reconstructed scene audio signal has the same subjective and objective quality as the audio signal in the original scene.

For better understanding and implementation of the foregoing solutions in embodiments of this application, descriptions are provided below by using corresponding application scenes as examples.

In this embodiment of this application, an example in which the scene audio signal is an HOA signal is used. A sound wave is propagated in an ideal medium, a quantity of waves is $k=w/c$, an angular frequency is $w=2\pi f$, f is a sound wave frequency, and c is a sound speed. A sound pressure p meets the following calculation formula, where $\nabla^2$ is a Laplace operator:

$$\nabla^2 p+k^2 p=0.$$

The foregoing equation is calculated in spherical coordinates. In a passive spherical region, the equation solution is expressed as the following calculation formula:

$$p(r, \theta, \varphi, k) = s\sum_{m=0}^{\infty}(2m+1)j^m j_m^{kr}(kr)\sum_{0\le n\le m,\sigma=\pm 1} Y_{m,n}^{\sigma}(\theta_s, \varphi_s)Y_{m,n}^{\sigma}(\theta, \varphi).$$

In the foregoing calculation formula, r represents a spherical radius, θ represents a horizontal angle, φ represents an elevation angle, k represents a quantity of waves, s is an amplitude of an ideal plane wave, and m is an HOA order sequence number. $j^m j_m^{kr}(kr)$ is a spherical Bessel function, and is also referred to as a radial basis function, where the first j is an imaginary unit. $(2m+1)j^m j_m^{kr}(kr)$ does not vary with the angle. $Y_{m,n}^{\sigma}(\theta, \varphi)$ is a spherical harmonic function in a θ, φ direction, and $Y_{m,n}^{\sigma}(\theta_s, \varphi_s)$ is a spherical harmonic function in a direction of a sound source.

The HOA coefficient may be expressed as: $B_{m,n}^{\sigma} = s \cdot Y_{m,n}^{\sigma}(\theta_s, \varphi_s)$.

The following calculation formula is provided:

$$p(r, \theta, \varphi, k) = \sum_{m=0}^{\infty} j^m j_m^{kr}(kr)\sum_{0\le n\le m,\sigma=\pm 1} B_{m,n}^{\sigma} Y_{m,n}^{\sigma}(\theta, \varphi).$$

The above calculation formula shows that the sound field can be expanded on the spherical surface based on the spherical harmonic function and expressed by using the coefficient $B_{m,n}^{\sigma}$. Alternatively, the sound field can be reconstructed if the coefficient $B_{m,n}^{\sigma}$ is known. The foregoing formula is truncated to the $N^{th}$ term. The coefficient $B_{m,n}^{\sigma}$ is used as an approximate description of the sound field, and is referred to as an N-order HOA coefficient. The HOA coefficient may also be referred to as an ambisonic coefficient. The N-order HOA coefficient has a total of $(N+1)^2$ channels. The ambisonic signal above the first order is also referred to as an HOA signal. A spatial sound field at a moment corresponding to a sampling point can be reconstructed by superimposing the spherical harmonic function based on a coefficient for the sampling point of the HOA signal.

For example, in one configuration, the HOA order may be 2 to 6 orders, a signal sampling rate is 48 to 192 kHz, and a sampling depth is 16 or 24 bits when a scene audio is recorded. The HOA signal is characterized by spatial information with a sound field, and the HOA signal is a description of a specific precision of a sound field signal at a specific point in space. Therefore, it may be considered that another representation form is used for describing the sound field signal at the point. In this description method, if the signal at the point can be described with a same precision by using a smaller amount of data, signal compression can be implemented.

The spatial sound field can be decomposed into superimposition of a plurality of plane waves. Therefore, a sound field expressed by the HOA signal may be expressed by using superimposition of the plurality of plane waves, and each plane wave is represented by using a one-channel audio signal and a direction vector. If the representation form of plane wave superimposition can better express the original sound field by using fewer channels, signal compression can be implemented.

During actual playback, the HOA signal may be played back by using a headphone, or may be played back by using a plurality of speakers arranged in a room. When the speaker is used for playback, a basic method is to superimpose sound fields of a plurality of speakers. In this way, under a specific standard, a sound field at a point (a location of a listener) in space is as close as possible to an original sound field when the HOA signal is recorded. In this embodiment of this application, it is assumed that a virtual speaker array is used. Then, a playback signal of the virtual speaker array is calculated, the playback signal is used as a transmission signal, and a compressed signal is further generated. The decoder side decodes the bitstream to obtain the playback signal, and reconstructs the scene audio signal based on the playback signal.

In this embodiment of this application, the encoder side applicable to scene audio signal encoding and the decoder side applicable to scene audio signal decoding are provided. The encoder side encodes an original HOA signal into a compressed bitstream, the encoder side sends the compressed bitstream to the decoder side, and then the decoder side restores the compressed bitstream to the reconstructed HOA signal. In this embodiment of this application, an amount of data compressed by the encoder side is as small as possible, or quality of an HOA signal reconstructed by the decoder side at a same bit rate is higher.

In this embodiment of this application, problems of a large amount of data, high bandwidth occupation, low compression efficiency, and low encoding quality can be resolved when the HOA signal is encoded. Because an N-order HOA signal has $(N+1)^2$ channels, direct transmission of the HOA signal needs to consume a large bandwidth. Therefore, an effective multi-channel encoding scheme is required.

Figure 5:
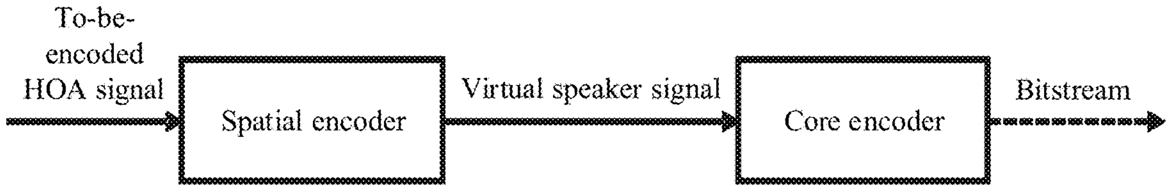
FIG. 5 is a schematic diagram of a structure of an encoder side according to an embodiment of this application.
Figure 6:
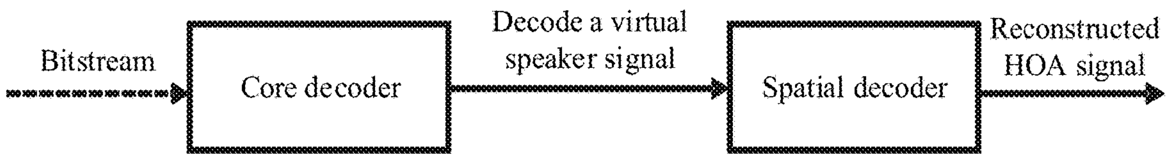
FIG. 6 is a schematic diagram of a structure of a decoder side according to an embodiment of this application.

In this embodiment of this application, different channel extraction methods are used, and an assumption of a sound source is not limited in this embodiment of this application, and an assumption of a single sound source in a time-frequency domain is not relied on. Therefore, a complex scenario such as a multi-sound source signal can be more effectively processed. The encoder and the decoder in this embodiment of this application provide a spatial encoding and decoding method in which an original HOA signal is represented by fewer channels. FIG. 5 is a schematic diagram of a structure of an encoder side according to an embodiment of this application. The encoder side includes a spatial encoder and a core encoder. The spatial encoder may perform channel extraction on a to-be-encoded HOA signal to generate a virtual speaker signal. The core encoder may encode the virtual speaker signal to obtain a bitstream. The encoder side sends the bitstream to a decoder side. FIG. 6 is a schematic diagram of a structure of a decoder side according to an embodiment of this application. The decoder side includes a core decoder and a spatial decoder. The core decoder first receives a bitstream from an encoder side, and then decodes the bitstream to obtain a virtual speaker signal. Then, the spatial decoder reconstructs the virtual speaker signal to obtain a reconstructed HOA signal.

The following separately describes examples of an encoder side and a decoder side.

Figure 7:
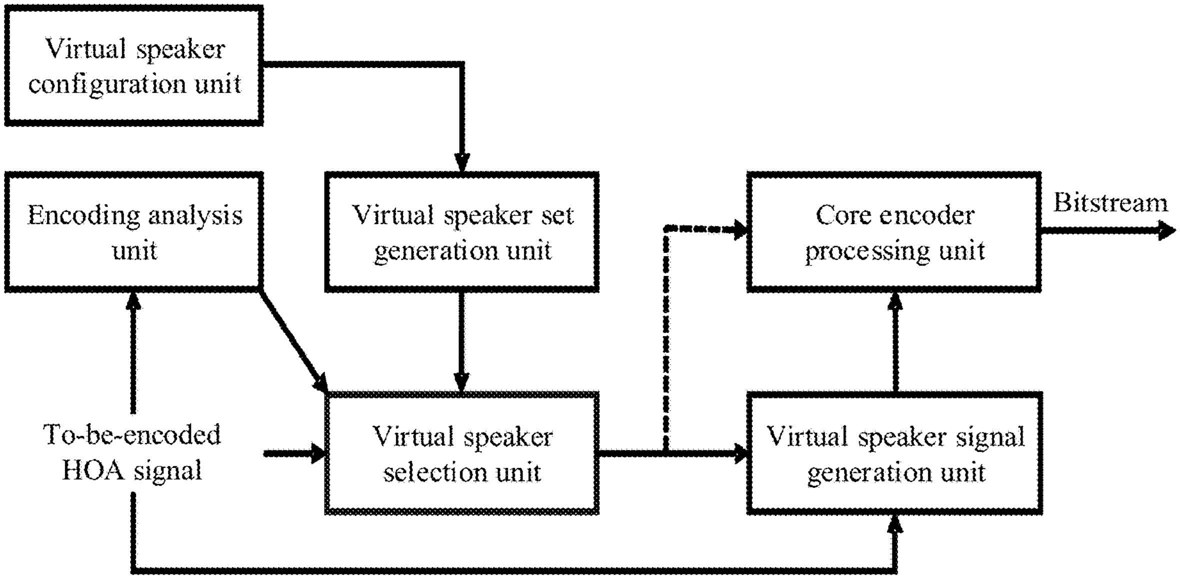
FIG. 7 is a schematic diagram of a structure of an encoder side according to an embodiment of this application.

As shown in FIG. 7, an encoder side provided in an embodiment of this application is first described. The encoder side may include a virtual speaker configuration unit, an encoding analysis unit, a virtual speaker set generation unit, a virtual speaker selection unit, a virtual speaker signal generation unit, and a core encoder processing unit. The following separately describes functions of each composition unit of the encoder side. In this embodiment of this application, the encoder side shown in FIG. 7 may generate one virtual speaker signal, or may generate a plurality of virtual speaker signals. A procedure of generating the plurality of virtual speaker signals may be generated for a plurality of times based on the structure of the encoder shown in FIG. 7. The following uses a procedure of generating one virtual speaker signal as an example.

The virtual speaker configuration unit is configured to configure virtual speakers in a virtual speaker set to obtain a plurality of virtual speakers.

The virtual speaker configuration unit outputs virtual speaker configuration parameters based on encoder configuration information. The encoder configuration information includes but is not limited to: an HOA order, an encoding bit rate, and user-defined information. The virtual speaker configuration parameter includes but is not limited to: a quantity of virtual speakers, an HOA order of the virtual speaker, location coordinates of the virtual speaker, and the like.

The virtual speaker configuration parameter output by the virtual speaker configuration unit is used as an input of the virtual speaker set generation unit.

The encoding analysis unit is configured to perform coding analysis on a to-be-encoded HOA signal, for example, analyze sound field distribution of the to-be-encoded HOA signal, including characteristics such as a quantity of sound sources, directivity, and dispersion of the to-be-encoded HOA signal. This is used as a determining condition on how to select a target virtual speaker.

In this embodiment of this application, the encoder side may not include the encoding analysis unit, that is, the encoder side may not analyze an input signal, and a default configuration is used for determining how to select the target virtual speaker. This is not limited herein.

The encoder side obtains the to-be-encoded HOA signal, for example, may use an HOA signal recorded from an actual acquisition device or an HOA signal synthesized by using an artificial audio object as an input of the encoder, and the to-be-encoded HOA signal input by the encoder may be a time-domain HOA signal or a frequency-domain HOA signal.

The virtual speaker set generation unit is configured to generate a virtual speaker set. The virtual speaker set may include a plurality of virtual speakers, and the virtual speaker in the virtual speaker set may also be referred to as a "candidate virtual speaker".

The virtual speaker set generation unit generates a specified HOA coefficient of the candidate virtual speaker. Generating the HOA coefficient of the candidate virtual speaker needs coordinates (that is, location coordinates or location information) of the candidate virtual speaker and an HOA order of the candidate virtual speaker. The method for determining the coordinates of the candidate virtual speaker includes but is not limited to generating K virtual speakers according to an equidistant rule, and generating K candidate virtual speakers that are not evenly distributed according to an auditory perception principle. The following gives an example of a method for generating a fixed quantity of virtual speakers that are evenly distributed.

Figure 8:
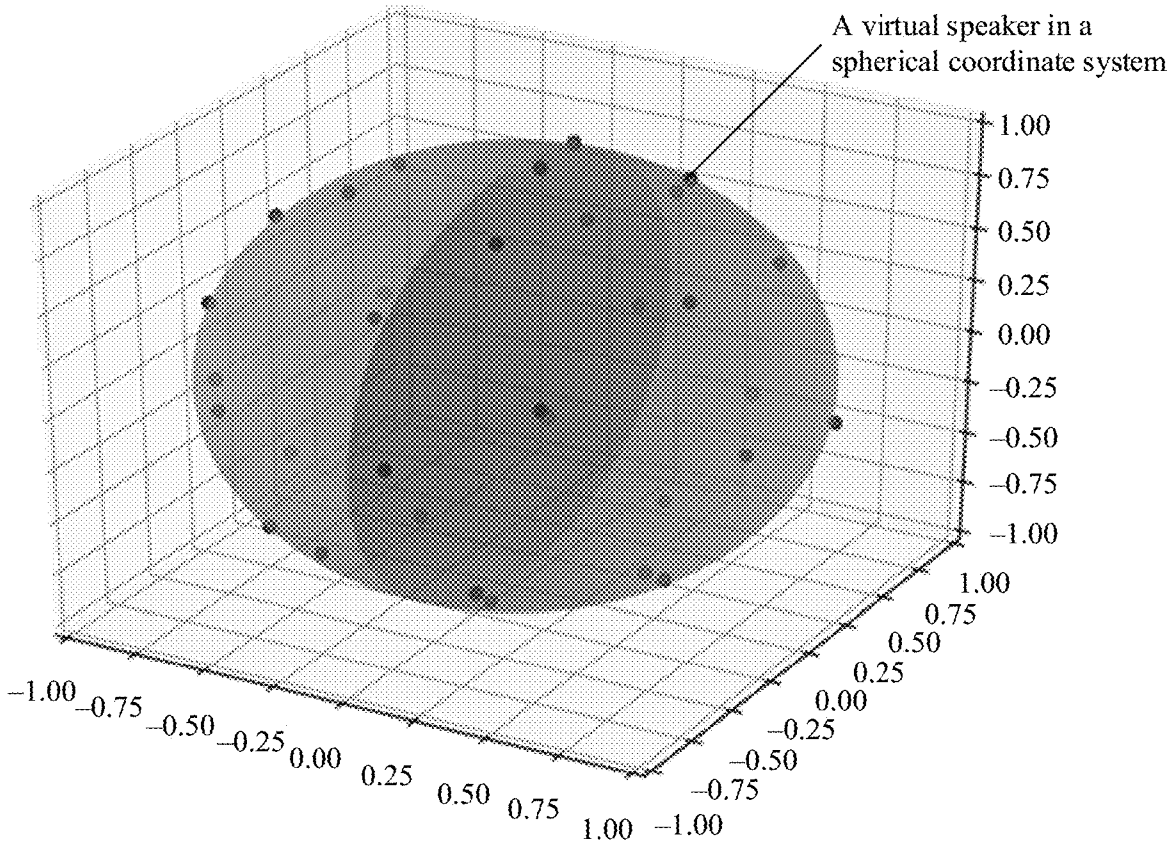
FIG. 8 is a schematic diagram of virtual speakers that are approximately evenly distributed on a spherical surface according to an embodiment of this application.

The coordinates of the evenly distributed candidate virtual speakers are generated based on the quantity of candidate virtual speakers. For example, approximately evenly distributed speakers are provided by using a numerical iteration calculation method. FIG. 8 is a schematic diagram of virtual speakers that are approximately evenly distributed on a spherical surface. It is assumed that some mass points are distributed on the unit spherical surface, and a quadratic inverse repulsion force is disposed between these mass points. This is similar to an electrostatic repulsion force between the same electric charge. These mass points are allowed to move freely under an action of repulsion, and it is expected that the mass points should be evenly distributed when the mass points reach a steady state. In the calculation, an actual physical law is simplified, and a moving distance of the mass point is directly equal to a force to which the mass point is subjected. Therefore, for an $i^{th}$ mass point, a motion distance of the $i^{th}$ mass point in a step of iterative calculation, that is, a virtual force to which the $i^{th}$ mass point is subjected, is calculated according to the following calculation formula:

$$\vec{D} = \vec{F} = \sum_{j=1 j \neq i}^{N} \frac{k}{r_{ij}^2} \vec{d}_{ij}.$$

$\vec{D}$ represents a displacement vector, $\vec{F}$ represents a force vector, $r_{ij}$ represents a distance between the $i^{th}$ mass point and the $j^{th}$ mass point, and $\vec{d}_{ij}$ represents a direction vector from the $j^{th}$ mass point to the $i^{th}$ mass point. The parameter k controls a size of a single step. An initial location of the mass point is randomly specified.

After moving according to the displacement vector $\vec{D}$, the mass point usually deviates from the unit spherical surface. Before a next iteration, a distance between the mass point and the center of the spherical surface is normalized, and the mass point is moved back to the unit spherical surface. Therefore, a schematic diagram of distribution of virtual speakers shown in FIG. 8 may be obtained, and a plurality of virtual speakers are approximately evenly distributed on the spherical surface.

Next, a HOA coefficient of a candidate virtual speaker is generated. An ideal plane wave whose amplitude is s and whose location coordinates of the speaker are ($\theta_s$, $\varphi_s$), and a form of the ideal plane wave after being expanded by using a spherical harmonic function is expressed as the following calculation formula:

$$p(r, \theta, \varphi, k) = s\sum_{m=0}^{\infty}(2m+1)j^m j_m^{kr}(kr)\sum_{0 \le n \le m, \sigma=\pm 1} Y_{mn}^{\sigma}(\theta_S, \varphi_s) Y_{m,n}^{\sigma}(\theta, \varphi).$$

The HOA coefficient of the plane wave is $B_{m,n}^{\sigma}$, and meets the following calculation formula:

$$B_{m,n}^{\sigma} = s \cdot Y_{m,n}^{\sigma}(\theta_s, \varphi_s).$$

The HOA coefficient of the candidate virtual speaker output by a virtual speaker set generation unit is used as an input of a virtual speaker selection unit.

The virtual speaker selection unit is configured to select a target virtual speaker from a plurality of candidate virtual speakers in a virtual speaker set based on a to-be-encoded HOA signal. The target virtual speaker may be referred to as a "virtual speaker matching the to-be-encoded HOA signal", or referred to as a matching virtual speaker for short.

The virtual speaker selection unit matches the to-be-encoded HOA signal with the HOA coefficient of the candidate virtual speaker output by the virtual speaker set generation unit, and selects a specified matching virtual speaker.

The following describes a method for selecting a virtual speaker by using an example. In an embodiment, after a candidate virtual speaker is obtained, a to-be-encoded HOA signal is matched with an HOA coefficient of the candidate virtual speaker output by the virtual speaker set generation unit, to find the best matching of the to-be-encoded HOA signal on the candidate virtual speaker. The goal is to match and combine the to-be-encoded HOA signal by using the HOA coefficient of the candidate virtual speaker. In an embodiment, an inner product is performed by using an HOA coefficient of a candidate virtual speaker and a to-be-encoded HOA signal, a candidate virtual speaker with a maximum absolute value of the inner product is selected as a target virtual speaker, that is, a matching virtual speaker, a projection of the to-be-encoded HOA signal on the candidate virtual speaker is superimposed on a linear combination of the HOA coefficient of the candidate virtual speaker, and then a projection vector is subtracted from the to-be-encoded HOA signal to obtain a difference. The foregoing process for the difference is repeated to implement iterative calculation, a matching virtual speaker is generated each time of iteration, and coordinates of the matching virtual speaker and an HOA coefficient of the matching virtual speaker are output. It may be understood that a plurality of matching virtual speakers are selected, and one matching virtual speaker is generated each time of iteration.

The coordinates of the target virtual speaker and the HOA coefficient of the target virtual speaker that are output by the virtual speaker selection unit are used as inputs of a virtual speaker signal generation unit.

In some embodiments of this application, in addition to the composition units shown in FIG. 7, the encoder side may further include a side information generation unit. The encoder side may not include the side information generation unit. This is only an example and is not limited herein.

The coordinates of the target virtual speaker and/or the HOA coefficient of the target virtual speaker that are output by the virtual speaker selection unit are/is used as inputs/an input of the side information generation unit.

The side information generation unit converts the HOA coefficients of the target virtual speaker or the coordinates of the target virtual speaker into side information. This facilitates processing and transmission of a core encoder.

An output of the side information generation unit is used as an input of a core encoder processing unit.

The virtual speaker signal generation unit is configured to generate a virtual speaker signal based on the to-be-encoded HOA signal and attribute information of the target virtual speaker.

The virtual speaker signal generation unit calculates the virtual speaker signal based on the to-be-encoded HOA signal and the HOA coefficient of the target virtual speaker.

The HOA coefficient of the matching virtual speaker is represented by a matrix A, and the to-be-encoded HOA signal may be obtained through linear combination by using the matrix A. A theoretical optimal solution w may be obtained by using a least square method, that is, the virtual speaker signal. For example, the following calculation formula may be used:

$$w=A^{-1}X.$$

$A_{-1}$ represents an inverse matrix of the matrix A, a size of the matrix A is (M×C), C is a quantity of target virtual speakers, M is a quantity of channels of N-order HOA coefficient, and a represents the HOA coefficient of the target virtual speaker. For example, $$A=\begin{bmatrix} a_{11} & \cdots & a_{1C} \\ \vdots & \ddots & \vdots \\ a_{M1} & \cdots & a_{MC} \end{bmatrix}.$$

X represents the to-be-encoded HOA signal, a size of the matrix X is (M×L), M is the quantity of channels of N-order HOA coefficient, L is a quantity of sampling points, and x represents a coefficient of the to-be-encoded HOA signal. For example, $$X=\begin{bmatrix} x_{11} & \cdots & x_{1L} \\ \vdots & \ddots & \vdots \\ x_{M1} & \cdots & x_{ML} \end{bmatrix}.$$

The virtual speaker signal output by the virtual speaker signal generation unit is used as an input of the core encoder processing unit.

In some embodiments of this application, in addition to the composition units shown in FIG. 7, the encoder side may further include a signal alignment unit. The encoder side may not include the signal alignment unit. This is only an example and is not limited herein.

The virtual speaker signal output by the virtual speaker signal generation unit is used as an input of the signal alignment unit.

The signal alignment unit is configured to readjust channels of the virtual speaker signals to enhance inter-channel correlation and facilitate processing of the core encoder.

An aligned virtual speaker signal output by the signal alignment unit is an input of the core encoder processing unit.

The core encoder processing unit is configured to perform core encoder processing on the side information and the aligned virtual speaker signal to obtain a transmission bitstream.

Core encoder processing includes but is not limited to transformation, quantization, psychoacoustic model, bitstream generation, and the like, and may process a frequency-domain channel or a time-domain channel. This is not limited herein.

Figure 9:
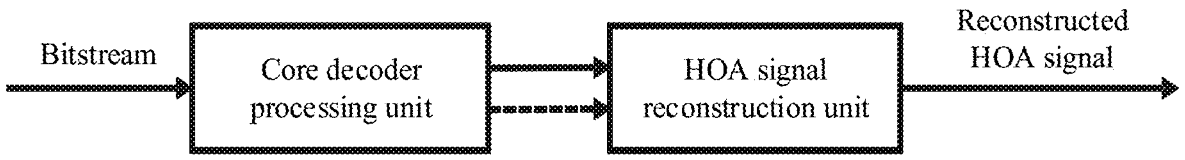
FIG. 9 is a schematic diagram of a structure of an encoder side according to an embodiment of this application.

As shown in FIG. 9, a decoder side provided in this embodiment of this application may include a core decoder processing unit and an HOA signal reconstruction unit.

The core decoder processing unit is configured to perform core decoder processing on a transmission bitstream to obtain a virtual speaker signal.

If an encoder side carries side information in the bitstream, the decoder side further needs to include a side information decoding unit. This is not limited herein.

The side information decoding unit is configured to decode decoding side information output by the core decoder processing unit, to obtain decoded side information.

Core decoder processing may include transformation, bitstream parsing, dequantization, and the like, and may process a frequency-domain channel or a time-domain channel. This is not limited herein.

The virtual speaker signal output by the core decoder processing unit is an input of the HOA signal reconstruction unit, and the decoding side information output by the core decoder processing unit is an input of the side information decoding unit.

The side information decoding unit converts the decoding side information into an HOA coefficient of a target virtual speaker.

The HOA coefficient of the target virtual speaker output by the side information decoding unit is an input of the HOA signal reconstruction unit.

The HOA signal reconstruction unit is configured to reconstruct the HOA signal by using the virtual speaker signal and the HOA coefficient of the target virtual speaker.

The HOA coefficient of the target virtual speaker is represented by a matrix A'. A size of the matrix A' is (M×C), and is denoted as A'. C is a quantity of target virtual speakers, and M is a quantity of channels of N-order HOA coefficient. Virtual speaker signals form a matrix (C×L), the matrix (C×L) is denoted as W', and L is a quantity of signal sampling points. The reconstructed HOA signal H is obtained according to the following calculation formula:

$$H=A'W'.$$

The reconstructed HOA signal output by the HOA signal reconstruction unit is an output of the decoder side.

In this embodiment of this application, the encoder side may use a spatial encoder to represent an original HOA signal by using fewer channels, for example, an original third-order HOA signal. The spatial encoder in this embodiment of this application can compress 16 channels into four channels, and ensure that subjective listening is not obviously different. A subjective listening test is an evaluation criterion in audio encoding and decoding, and no obvious difference is a level of subjective evaluation.

In some other embodiments of this application, a virtual speaker selection unit of the encoder side selects a target virtual speaker from a virtual speaker set, or may use a virtual speaker at a specified location as the target virtual speaker, and a virtual speaker signal generation unit directly performs projection on each target virtual speaker to obtain a virtual speaker signal.

In the foregoing manner, the virtual speaker at the specified location is used as the target virtual speaker. This can simplify a virtual speaker selection process, and improve an encoding and decoding speed.

In some other embodiments of this application, the encoder side may not include a signal alignment unit. In this case, an output of the virtual speaker signal generation unit is directly encoded by the core encoder. In the foregoing manner, signal alignment processing is reduced, and complexity of the encoder side is reduced.

It can be learned from the foregoing example descriptions that, in this embodiment of this application, the selected target virtual speaker is applied to HOA signal encoding and decoding. In this embodiment of this application, accurate sound source positioning of the HOA signal can be obtained, a direction of the reconstructed HOA signal is more accurate, encoding efficiency is higher, and complexity of the decoder side is very low. This is beneficial to an application on a mobile terminal and can improve encoding and decoding performance.

It should be noted that, for brief description, the foregoing method embodiments are represented as a series of actions. However, a person skilled in the art should appreciate that this application is not limited to the described order of the actions, because according to this application, some operations may be performed in other orders or simultaneously. It should be further appreciated by a person skilled in the art that embodiments described in this specification all belong to example embodiments, and the involved actions and modules are not necessarily required by this application.

To better implement the solutions of embodiments of this application, a related apparatus for implementing the solutions is further provided below.

Figure 10:
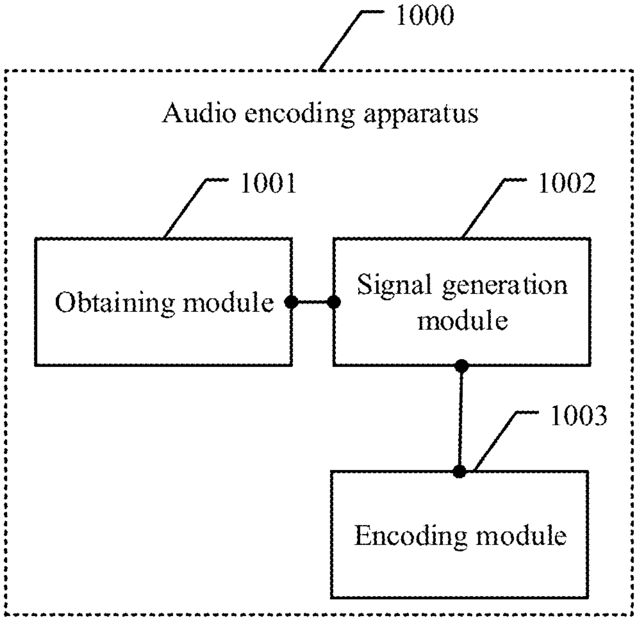
FIG. 10 is a schematic diagram of a composition structure of an audio encoding apparatus according to an embodiment of this application.

Refer to FIG. 10. An audio encoding apparatus 1000 provided in an embodiment of this application may include an obtaining module 1001, a signal generation module 1002, and an encoding module 1003, where the obtaining module is configured to select a first target virtual speaker from a preset virtual speaker set based on a current scene audio signal;

the signal generation module is configured to generate a first virtual speaker signal based on the current scene audio signal and attribute information of the first target virtual speaker; and the encoding module is configured to encode the first virtual speaker signal to obtain a bitstream.

In some embodiments of this application, the obtaining module is configured to: obtain a main sound field component from the current scene audio signal based on the virtual speaker set; and select the first target virtual speaker from the virtual speaker set based on the main sound field component.

In some embodiments of this application, the obtaining module is configured to: select an HOA coefficient for the main sound field component from a higher order ambisonics HOA coefficient set based on the main sound field component, where HOA coefficients in the HOA coefficient set are in a one-to-one correspondence with virtual speakers in the virtual speaker set; and determine, as the first target virtual speaker, a virtual speaker that corresponds to the HOA coefficient for the main sound field component and that is in the virtual speaker set.

In some embodiments of this application, the obtaining module is configured to: obtain a configuration parameter of the first target virtual speaker based on the main sound field component; generate, based on the configuration parameter of the first target virtual speaker, an HOA coefficient for the first target virtual speaker; and determine, as the target virtual speaker, a virtual speaker that corresponds to the HOA coefficient for the first target virtual speaker and that is in the virtual speaker set.

In some embodiments of this application, the obtaining module is configured to: determine configuration parameters of a plurality of virtual speakers in the virtual speaker set based on configuration information of an audio encoder; and select the configuration parameter of the first target virtual speaker from the configuration parameters of the plurality of virtual speakers based on the main sound field component.

In some embodiments of this application, the configuration parameter of the first target virtual speaker includes location information and HOA order information of the first target virtual speaker; and the obtaining module is configured to determine, based on the location information and the HOA order information of the first target virtual speaker, the HOA coefficient for the first target virtual speaker.

In some embodiments of this application, the encoding module is further configured to encode the attribute information of the first target virtual speaker, and write encoded attribute information into the bitstream.

In some embodiments of this application, the current scene audio signal includes a to-be-encoded HOA signal, and the attribute information of the first target virtual speaker includes the HOA coefficient of the first target virtual speaker; and the signal generation module is configured to perform linear combination on the to-be-encoded HOA signal and the HOA coefficient to obtain the first virtual speaker signal.

In some embodiments of this application, the current scene audio signal includes a to-be-encoded higher order ambisonics HOA signal, and the attribute information of the first target virtual speaker includes the location information of the first target virtual speaker; and the signal generation module is configured to: obtain, based on the location information of the first target virtual speaker, the HOA coefficient for the first target virtual speaker; and perform linear combination on the to-be-encoded HOA signal and the HOA coefficient to obtain the first virtual speaker signal.

In some embodiments of this application, the obtaining module is configured to select a second target virtual speaker from the virtual speaker set based on the current scene audio signal;

the signal generation module is configured to generate a second virtual speaker signal based on the current scene audio signal and attribute information of the second target virtual speaker; and the encoding module is configured to encode the second virtual speaker signal, and write an encoded second virtual speaker signal into the bitstream.

In some embodiments of this application, the signal generation module is configured to perform alignment processing on the first virtual speaker signal and the second virtual speaker signal to obtain an aligned first virtual speaker signal and an aligned second virtual speaker signal;

correspondingly, the encoding module is configured to encode the aligned second virtual speaker signal; and correspondingly, the encoding module is configured to encode the aligned first virtual speaker signal.

In some embodiments of this application, the obtaining module is configured to select a second target virtual speaker from the virtual speaker set based on the current scene audio signal;

the signal generation module is configured to generate a second virtual speaker signal based on the current scene audio signal and attribute information of the second target virtual speaker; and correspondingly, the encoding module is configured to obtain a downmixed signal and side information based on the first virtual speaker signal and the second virtual speaker signal, where the side information indicates a relationship between the first virtual speaker signal and the second virtual speaker signal; and encode the downmixed signal and the side information.

In some embodiments of this application, the signal generation module is configured to perform alignment processing on the first virtual speaker signal and the second virtual speaker signal to obtain an aligned first virtual speaker signal and an aligned second virtual speaker signal;

correspondingly, the encoding module is configured to obtain the downmixed signal and the side information based on the aligned first virtual speaker signal and the aligned second virtual speaker signal; and correspondingly, the side information indicates a relationship between the aligned first virtual speaker signal and the aligned second virtual speaker signal.

In some embodiments of this application, the obtaining module is configured to: before the selecting a second target virtual speaker from the virtual speaker set based on the current scene audio signal, determine, based on an encoding rate and/or signal type information of the current scene audio signal, whether a target virtual speaker other than the first target virtual speaker needs to be obtained; and select the second target virtual speaker from the virtual speaker set based on the current scene audio signal if the target virtual speaker other than the first target virtual speaker needs to be obtained.

Figure 11:
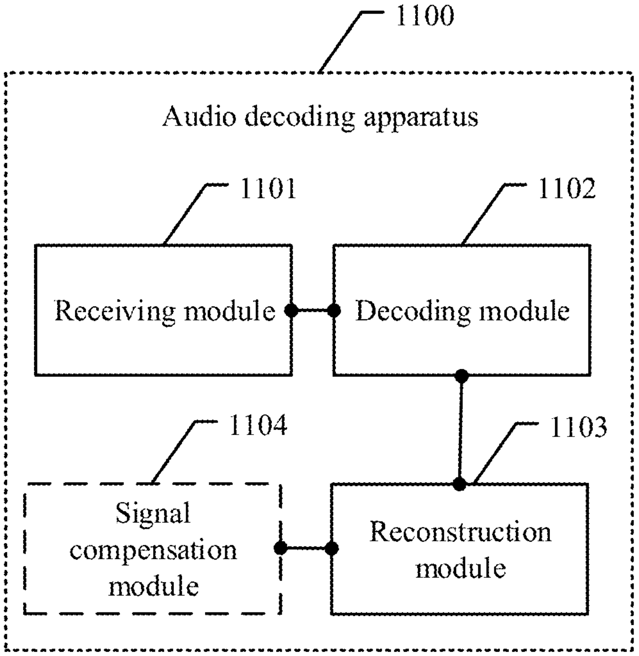
FIG. 11 is a schematic diagram of a composition structure of an audio decoding apparatus according to an embodiment of this application.

Refer to FIG. 11. An audio decoding apparatus 1100 provided in an embodiment of this application may include a receiving module 1101, a decoding module 1102, and a reconstruction module 1103, where the receiving module is configured to receive a bitstream;

the decoding module is configured to decode the bitstream to obtain a virtual speaker signal; and the reconstruction module is configured to obtain a reconstructed scene audio signal based on attribute information of a target virtual speaker and the virtual speaker signal.

In some embodiments of this application, the decoding module is further configured to decode the bitstream to obtain the attribute information of the target virtual speaker.

In some embodiments of this application, the attribute information of the target virtual speaker includes a higher order ambisonics HOA coefficient of the target virtual speaker; and the reconstruction module is configured to perform synthesis processing on the virtual speaker signal and the HOA coefficient of the target virtual speaker to obtain the reconstructed scene audio signal.

In some embodiments of this application, the attribute information of the target virtual speaker includes location information of the target virtual speaker; and the reconstruction module is configured to determine an HOA coefficient of the target virtual speaker based on the location information of the target virtual speaker; and perform synthesis processing on the virtual speaker signal and the HOA coefficient of the target virtual speaker to obtain the reconstructed scene audio signal.

In some embodiments of this application, the virtual speaker signal is a downmixed signal obtained by downmixing a first virtual speaker signal and a second virtual speaker signal, and the apparatus further includes a signal compensation module, where the decoding module is configured to decode the bitstream to obtain side information, where the side information indicates a relationship between the first virtual speaker signal and the second virtual speaker signal;

the signal compensation module is configured to obtain the first virtual speaker signal and the second virtual speaker signal based on the side information and the downmixed signal; and correspondingly, the reconstruction module is configured to obtain the reconstructed scene audio signal based on the attribute information of the target virtual speaker, the first virtual speaker signal, and the second virtual speaker.

It should be noted that, content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

An embodiment of this application further provides a computer storage medium. The computer storage medium stores a program, and the program performs a part or all of the operations described in the foregoing method embodiments.

Figure 12:
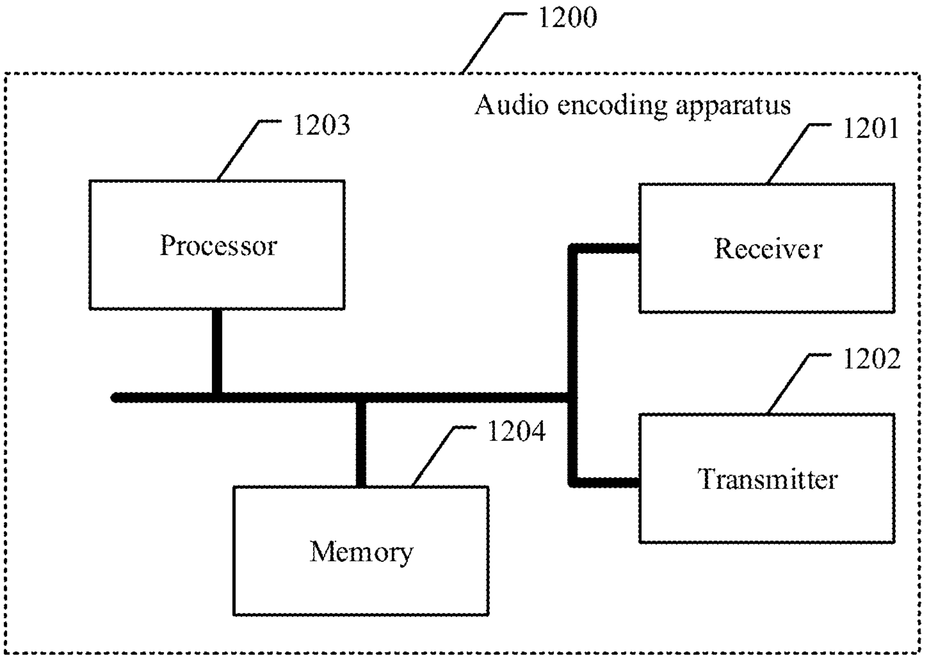
FIG. 12 is a schematic diagram of a composition structure of another audio encoding apparatus according to an embodiment of this application.

The following describes another audio encoding apparatus provided in an embodiment of this application. Refer to FIG. 12. The audio encoding apparatus 1200 includes:

a receiver 1201, a transmitter 1202, a processor 1203, and a memory 1204 (there may be one or more processors 1203 in the audio encoding apparatus 1200, and one processor is used as an example in FIG. 12). In some embodiments of this application, the receiver 1201, the transmitter 1202, the processor 1203, and the memory 1204 may be connected through a bus or in another manner. In FIG. 12, connection through a bus is used as an example.

The memory 1204 may include a read-only memory and a random access memory, and provide instructions and data to the processor 1203. A part of the memory 1204 may further include a non-volatile random access memory (NVRAM). The memory 1204 stores an operating system and operation instructions, an executable module or a data structure, or a subset thereof, or an extended set thereof. The operation instructions may include various operation instructions used to implement various operations. The operating system may include various system programs, to implement various basic services and process hardware-based tasks.

The processor 1203 controls an operation of the audio encoding apparatus, and the processor 1203 may also be referred to as a central processing unit (CPU). In an embodiment, components of the audio encoding apparatus are coupled together through a bus system. In addition to a data bus, the bus system may further include a power bus, a control bus, a status signal bus, and the like. However, for clear description, various types of buses in the figure are referred as the bus system.

The methods disclosed in embodiments of this application may be applied to the processor 1203, or may be implemented by using the processor 1203. The processor 1203 may be an integrated circuit chip and has a signal processing capability. During implementation, the operations of the foregoing method may be completed by using a hardware integrated logic circuit in the processor 1203 or instructions in the form of software. The processor 1203 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, operations, and logical block diagrams that are disclosed in embodiments of this application. The general-purpose processor may be a microprocessor, or the processor may be any conventional processor or the like. Operations of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1204, and the processor 1203 reads information in the memory 1204 and completes the operations in the foregoing methods in combination with hardware of the processor 1203.

The receiver 1201 may be configured to receive input digital or character information, and generate signal input related to a related setting and function control of the audio encoding apparatus. The transmitter 1202 may include a display device such as a display screen. The transmitter 1202 may be configured to output digital or character information through an external interface.

In this embodiment of this application, the processor 1203 is configured to perform the audio encoding method performed by the audio encoding apparatus in the foregoing embodiment shown in FIG. 4.

Figure 13:
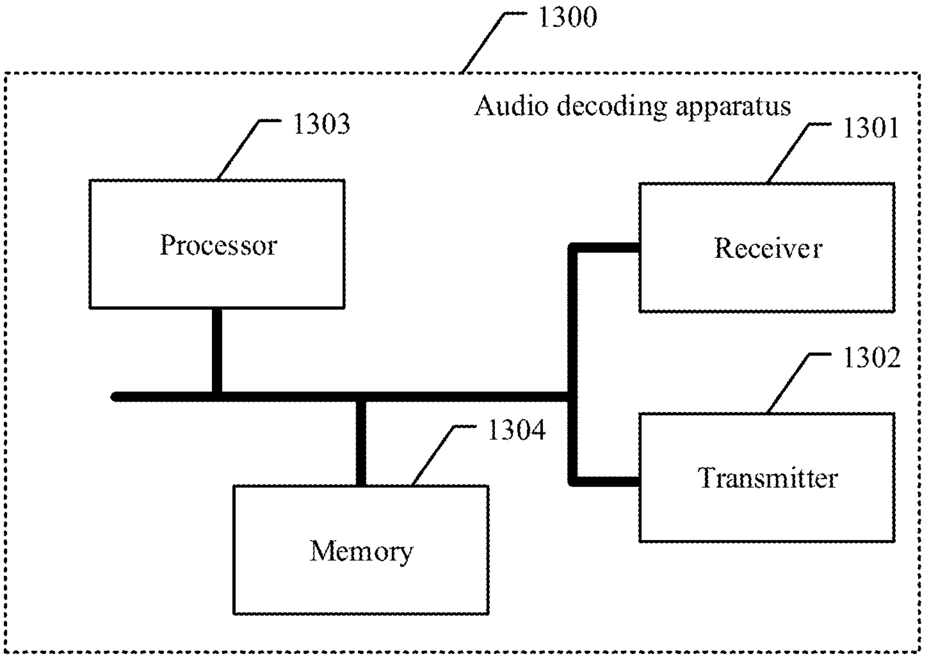
FIG. 13 is a schematic diagram of a composition structure of another audio decoding apparatus according to an embodiment of this application.

The following describes another audio decoding apparatus provided in an embodiment of this application. Refer to FIG. 13. An audio decoding apparatus 1300 includes:

a receiver 1301, a transmitter 1302, a processor 1303, and a memory 1304 (there may be one or more processors 1303 in the audio decoding apparatus 1300, and one processor is used as an example in FIG. 13). In some embodiments of this application, the receiver 1301, the transmitter 1302, the processor 1303, and the memory 1304 may be connected through a bus or in another manner. In FIG. 13, connection through a bus is used as an example.

The memory 1304 may include a read-only memory and a random access memory, and provide instructions and data for the processor 1303. A part of the memory 1304 may further include an NVRAM. The memory 1304 stores an operating system and operation instructions, an executable module or a data structure, or a subset thereof, or an extended set thereof. The operation instructions may include various operation instructions used to implement various operations. The operating system may include various system programs, to implement various basic services and process hardware-based tasks.

The processor 1303 controls an operation of the audio decoding apparatus, and the processor 1303 may also be referred to as a CPU. In an embodiment, components of the audio decoding apparatus are coupled together through a bus system. In addition to a data bus, the bus system may further include a power bus, a control bus, a status signal bus, and the like. However, for clear description, various types of buses in the figure are referred as the bus system.

The methods disclosed in embodiments of this application may be applied to the processor 1303, or may be implemented by using the processor 1303. The processor 1303 may be an integrated circuit chip, and has a signal processing capability. In an embodiment, operations in the foregoing methods may be implemented by using a hardware integrated logical circuit in the processor 1303, or by using instructions in a form of software. The foregoing processor 1303 may be a general-purpose processor, a DSP, an ASIC, an FPGA or another programmable logic device, a discrete gate or transistor logic device, or a discrete hardware component. The processor may implement or perform the methods, operations, and logical block diagrams that are disclosed in embodiments of this application. The general-purpose processor may be a microprocessor, or the processor may be any conventional processor or the like. Operations of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1304, and the processor 1303 reads information in the memory 1304 and completes the operations in the foregoing methods in combination with hardware in the processor 1303.

In this embodiment of this application, the processor 1303 is configured to perform the audio decoding method performed by the audio decoding apparatus in the foregoing embodiment shown in FIG. 4.

In another possible design, when the audio encoding apparatus or the audio decoding apparatus is a chip in a terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, to enable the chip in the terminal to perform the audio encoding method according to any one of the implementations of the first aspect or the audio decoding method according to any one of the implementations of the second aspect. In an embodiment, the storage unit is a storage unit in the chip, for example, a register or a cache. Alternatively, the storage unit may be a storage unit that is in the terminal and that is located outside the chip, for example, a read-only memory (ROM), another type of static storage device that can store static information and instructions, or a random access memory (RAM).

The processor mentioned above may be a general-purpose central processing unit, a microprocessor, an ASIC, or one or more integrated circuits configured to control program execution of the method in the first aspect or the second aspect.

In addition, it should be noted that the described apparatus embodiment is merely an example. The units described as separate parts may or may not be physically separate, and parts displayed as units may or may not be physical units, may be located in one location, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An audio decoding apparatus, comprising:

at least one processor is configured to be coupled to a memory storing instructions, which when executed by the at least one processor, cause the audio decoding apparatus to perform operations, the operations comprising:

receiving a bitstream;

decoding the bitstream to obtain a virtual speaker signal;

decoding the bitstream to obtain attribute information of a target virtual speaker; and obtaining a reconstructed scene audio signal based on the attribute information of the target virtual speaker and the virtual speaker signal;

wherein:

the attribute information of the target virtual speaker comprises location information of the target virtual speaker; and obtaining the reconstructed scene audio signal comprises:

determining a higher order ambisonics (HOA) coefficient of the target virtual speaker based on the location information of the target virtual speaker; and performing synthesis processing on the virtual speaker signal and the HOA coefficient of the target virtual speaker to obtain the reconstructed scene audio signal.

2. The method according to claim 1, further comprising:

encoding the attribute information of the first target virtual speaker, and writing encoded attribute information into the bitstream.

3. The method according to claim 1, wherein the current scene audio signal comprises a to-be-encoded higher order ambisonics (HOA) signal, and the attribute information of the first target virtual speaker comprises an HOA coefficient of the first target virtual speaker; and generating the first virtual speaker signal comprises:

performing linear combination on the to-be-encoded HOA signal and the HOA coefficient of the first target virtual speaker to obtain the first virtual speaker signal.

4. The method according to claim 1, wherein the current scene audio signal comprises a to-be-encoded higher order ambisonics (HOA) signal, and the attribute information of the first target virtual speaker comprises location information of the first target virtual speaker; and generating the first virtual speaker signal comprises:

obtaining, based on the location information of the first target virtual speaker, an HOA coefficient for the first target virtual speaker; and performing linear combination on the to-be-encoded HOA signal and the HOA coefficient for the first target virtual speaker to obtain the first virtual speaker signal.

5. The method according to claim 1, wherein the method further comprises:

selecting a second target virtual speaker from the preset virtual speaker set based on the current scene audio signal; and generating a second virtual speaker signal based on the current scene audio signal and attribute information of the second target virtual speaker; and encoding the first virtual speaker signal comprises:

obtaining a downmixed signal and side information based on the first virtual speaker signal and the second virtual speaker signal, wherein the side information indicates a relationship between the first virtual speaker signal and the second virtual speaker signal; and encoding the downmixed signal and the side information.

6. A method of audio decoding, comprising:

receiving a bitstream;

decoding the bitstream to obtain a virtual speaker signal;

decoding the bitstream to obtain attribute information of a target virtual speaker; and obtaining a reconstructed scene audio signal based on the attribute information of the target virtual speaker and the virtual speaker signal;

wherein:

the attribute information of the target virtual speaker comprises location information of the target virtual speaker; and obtaining the reconstructed scene audio signal comprises:

determining a higher order ambisonics (HOA) coefficient of the target virtual speaker based on the location information of the target virtual speaker; and performing synthesis processing on the virtual speaker signal and the HOA coefficient of the target virtual speaker to obtain the reconstructed scene audio signal.

7. The method according to claim 6, wherein the virtual speaker signal is a downmixed signal obtained by downmixing a first virtual speaker signal and a second virtual speaker signal, and the method further comprises:

decoding the bitstream to obtain side information, wherein the side information indicates a relationship between the first virtual speaker signal and the second virtual speaker signal; and obtaining the first virtual speaker signal and the second virtual speaker signal based on the side information and the downmixed signal; and obtaining the reconstructed scene audio signal comprises:

obtaining the reconstructed scene audio signal based on the attribute information of the target virtual speaker, the first virtual speaker signal, and the second virtual speaker signal.

8. An audio encoding apparatus, comprising:

at least one processor coupled to a memory storing instructions, which when executed by the at least one processor, cause the audio encoding apparatus to perform operations, the operations comprising:

selecting a first target virtual speaker from a preset virtual speaker set based on a current scene audio signal;

generating a first virtual speaker signal based on the current scene audio signal and attribute information of the first target virtual speaker;

encoding the first virtual speaker signal to obtain a bitstream; and obtaining a main sound field component from the current scene audio signal based on the preset virtual speaker set;

wherein:

selecting the first target virtual speaker from the preset virtual speaker set comprises:

selecting the first target virtual speaker from the preset virtual speaker set based on the main sound field component; and selecting the first target virtual speaker from the preset virtual speaker set based on the main sound field component comprises:

selecting a higher order ambisonics (HOA) coefficient for the main sound field component from an HOA coefficient set based on the main sound field component, wherein HOA coefficients in the HOA coefficient set are in a one-to-one correspondence with virtual speakers in the preset virtual speaker set; and determining, as the first target virtual speaker, a virtual speaker that corresponds to the HOA coefficient for the main sound field component and is in the preset virtual speaker set.

9. The audio encoding apparatus according to claim 8, wherein the current scene audio signal comprises a to-be-encoded higher order ambisonics (HOA) signal, and the attribute information of the first target virtual speaker comprises an HOA coefficient of the first target virtual speaker; and generating the first virtual speaker signal comprises:

performing linear combination on the to-be-encoded HOA signal and the HOA coefficient of the first target virtual speaker to obtain the first virtual speaker signal.

10. The audio encoding apparatus according to claim 8, wherein the current scene audio signal comprises a to-be-encoded higher order ambisonics (HOA) signal, and the attribute information of the first target virtual speaker comprises location information of the first target virtual speaker; and generating the first virtual speaker signal comprises:

obtaining, based on the location information of the first target virtual speaker, an HOA coefficient for the first target virtual speaker; and performing linear combination on the to-be-encoded HOA signal and the HOA coefficient for the first target virtual speaker to obtain the first virtual speaker signal.

11. The audio encoding apparatus according to claim 8, wherein the operations further comprise:

selecting a second target virtual speaker from the preset virtual speaker set based on the current scene audio signal; and generating a second virtual speaker signal based on the current scene audio signal and attribute information of the second target virtual speaker; and encoding the first virtual speaker signal comprises:

obtaining a downmixed signal and side information based on the first virtual speaker signal and the second virtual speaker signal, wherein the side information indicates a relationship between the first virtual speaker signal and the second virtual speaker signal; and encoding the downmixed signal and the side information.

12. An audio decoding apparatus, comprising:

at least one processor coupled to a memory storing instructions, which when executed by the at least one processor, cause the audio decoding apparatus to perform operations, the operations comprising:

receiving a bitstream;

decoding the bitstream to obtain a virtual speaker signal;

decoding the bitstream to obtain attribute information of a target virtual speaker; and obtaining a reconstructed scene audio signal based on the attribute information of the target virtual speaker and the virtual speaker signal;

wherein:

the attribute information of the target virtual speaker comprises location information of the target virtual speaker; and obtaining the reconstructed scene audio signal comprises:

determining an HOA coefficient of the target virtual speaker based on the location information of the target virtual speaker; and performing synthesis processing on the virtual speaker signal and the HOA coefficient of the target virtual speaker to obtain the reconstructed scene audio signal.

13. The audio decoding apparatus according to claim 12, wherein the virtual speaker signal is a downmixed signal obtained by downmixing a first virtual speaker signal and a second virtual speaker signal, and the method further comprises:

decoding the bitstream to obtain side information, wherein the side information indicates a relationship between the first virtual speaker signal and the second virtual speaker signal; and obtaining the first virtual speaker signal and the second virtual speaker signal based on the side information and the downmixed signal; and obtaining the reconstructed scene audio signal comprises:

obtaining the reconstructed scene audio signal based on the attribute information of the target virtual speaker, the first virtual speaker signal, and the second virtual speaker signal.

* * * * *